United States Patent
Kim et al.

(10) Patent No.: US 9,852,528 B2
(45) Date of Patent: Dec. 26, 2017

(54) DISPLAY DEVICE HAVING DISPLAY SCREEN AND METHOD FOR CONTROLLING CURVATURE OF THE DISPLAY SCREEN

(71) Applicant: LG ELECTRONICS INC., Seoul (KR)

(72) Inventors: Uniyoung Kim, Seoul (KR); Ryunghwa Rhee, Seoul (KR); Jongsuk Ryu, Seoul (KR); Kunsik Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 135 days.

(21) Appl. No.: 14/282,092

(22) Filed: May 20, 2014

(65) Prior Publication Data

US 2015/0049090 A1 Feb. 19, 2015

(30) Foreign Application Priority Data

Aug. 13, 2013 (KR) .......................... 10-2013-0095870

(51) Int. Cl.
*G06T 11/20* (2006.01)
*G06F 3/0487* (2013.01)
(Continued)

(52) U.S. Cl.
CPC .......... *G06T 11/203* (2013.01); *G06F 3/0484* (2013.01); *G06F 3/0485* (2013.01); *G06F 3/0487* (2013.01); *G06F 1/1652* (2013.01)

(58) Field of Classification Search
CPC ..................................................... G06T 11/203
See application file for complete search history.

(56) References Cited

U.S. PATENT DOCUMENTS

| 8,760,515 B2 * | 6/2014 | Abe .......................... B60R 1/00 345/427 |
| 2009/0147224 A1 * | 6/2009 | Kurozuka ............ H04N 9/3129 353/98 |

(Continued)

FOREIGN PATENT DOCUMENTS

| CN | 1391683 | 1/2003 |
| CN | 1735837 | 2/2006 |

(Continued)

OTHER PUBLICATIONS

European Search Report dated Apr. 21, 2015 issued in Application No. 14166120.7.

(Continued)

*Primary Examiner* — Kee M Tung
*Assistant Examiner* — Grace Q Li
(74) *Attorney, Agent, or Firm* — KED & Associates, LLP

(57) ABSTRACT

A display device and a method for controlling the same are disclosed. Herein, the method for controlling a display device is designed to include the steps of outputting a first Graphical User Interface (GUI), receiving a curvature change signal of a display screen outputting the first GUI, changing a curvature of the display screen based upon the received signal, generating a second GUI based upon GUI change data corresponding to the changed curvature of the display screen, and outputting the generated second GUI on the display screen.

14 Claims, 15 Drawing Sheets

(51) Int. Cl.
*G06F 3/0484* (2013.01)
*G06F 3/0485* (2013.01)
*G06F 1/16* (2006.01)

(56) References Cited

U.S. PATENT DOCUMENTS

| | | | |
|---|---|---|---|
| 2010/0141605 A1 | 6/2010 | Kang et al. | |
| 2011/0182441 A1* | 7/2011 | Coffman | G06F 3/165 381/107 |
| 2012/0013607 A1* | 1/2012 | Lee | G06T 15/20 345/419 |
| 2012/0075166 A1* | 3/2012 | Marti | G06F 3/011 345/1.1 |
| 2012/0092363 A1* | 4/2012 | Kim | G06T 5/006 345/618 |
| 2012/0139834 A1* | 6/2012 | Han | G06F 3/03 345/157 |
| 2012/0206896 A1* | 8/2012 | Suzuki | G06F 1/1641 361/807 |
| 2013/0114193 A1* | 5/2013 | Joo | F16M 11/08 361/679.01 |
| 2014/0328505 A1* | 11/2014 | Heinemann | H04S 7/303 381/303 |

FOREIGN PATENT DOCUMENTS

| | | |
|---|---|---|
| CN | 101050948 | 10/2007 |
| CN | 101268402 | 9/2008 |
| CN | 101685547 | 3/2010 |
| CN | 102473363 | 5/2012 |
| CN | 103093699 | 5/2013 |
| EP | 2 592 614 A1 | 5/2013 |
| WO | WO 2009/050812 | 4/2009 |

OTHER PUBLICATIONS

Chinese Office Action (with partial English translation) dated Nov. 30, 2016 issued in Application No. 201410306768.1.

* cited by examiner

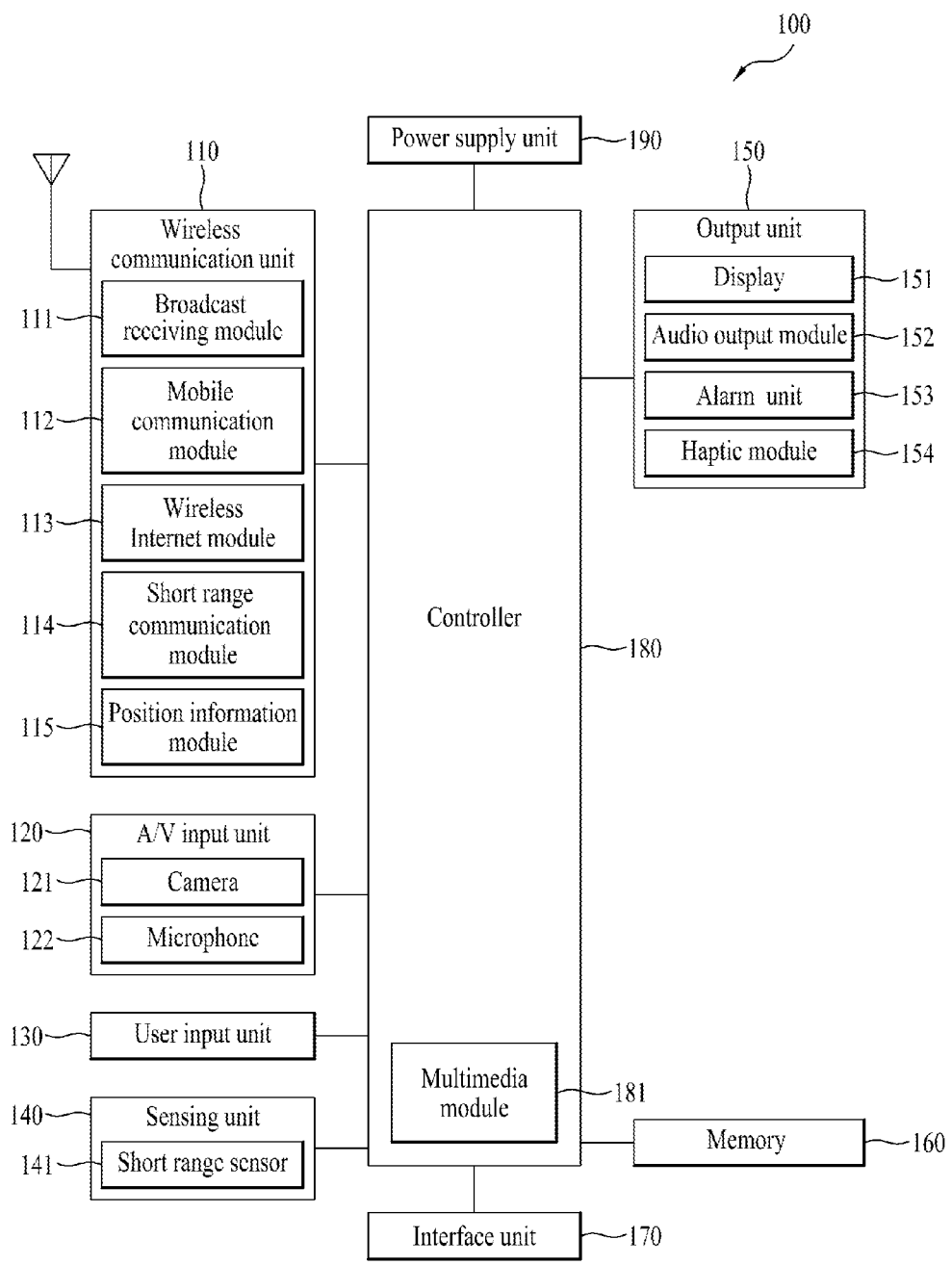

FIG. 8
(a)
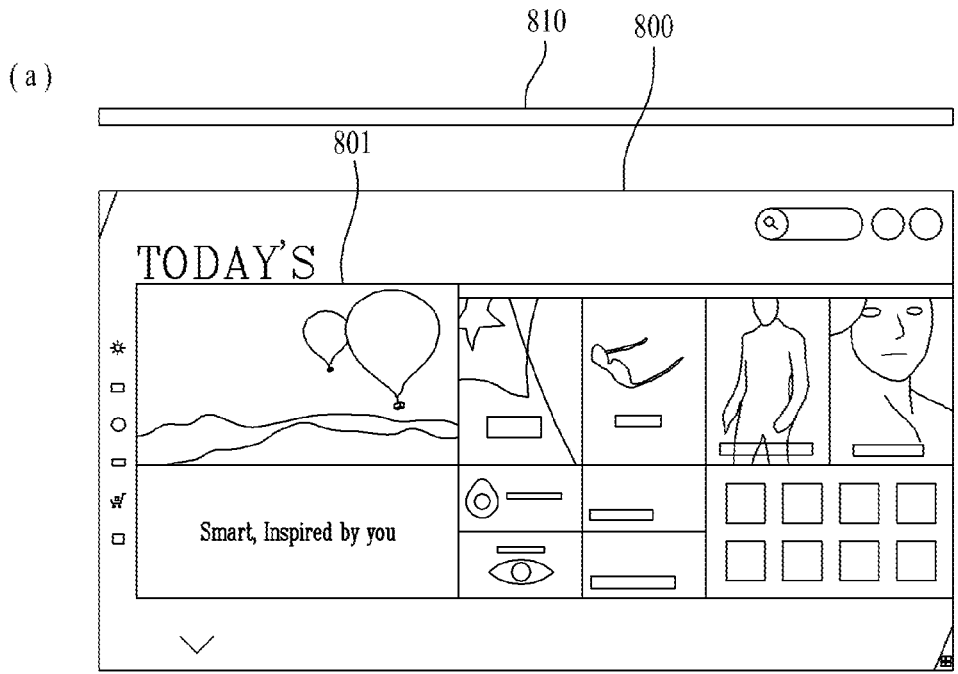
(b)
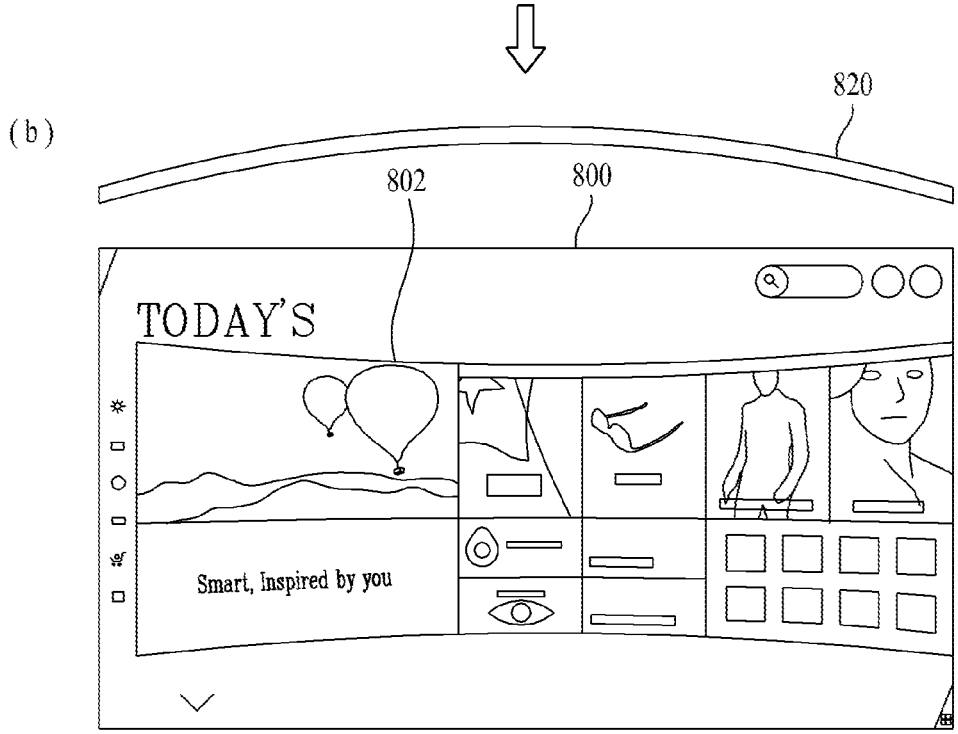

FIG. 10
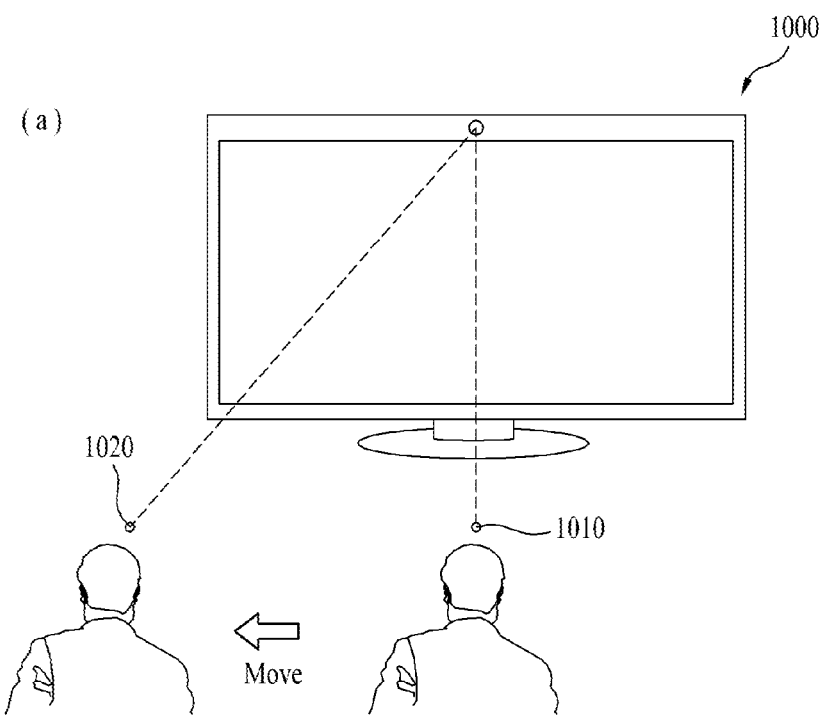
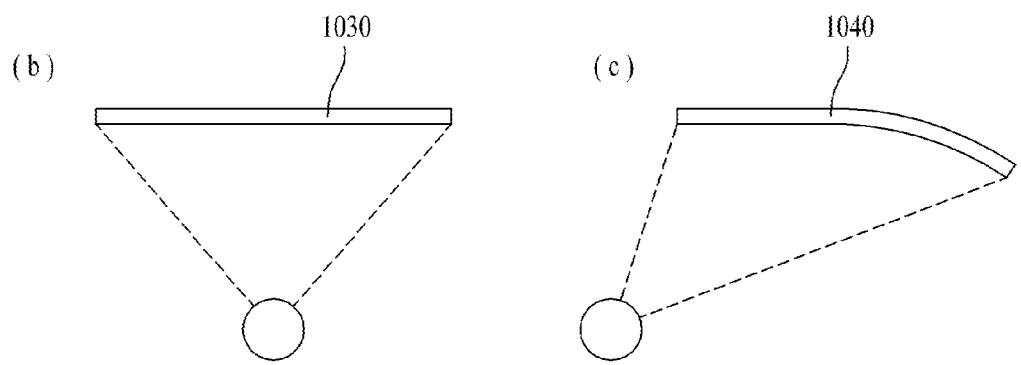

FIG. 13
(a)
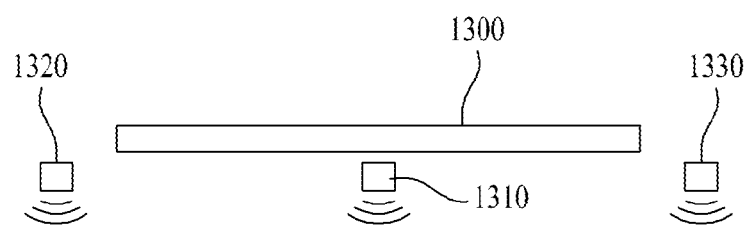
(b)
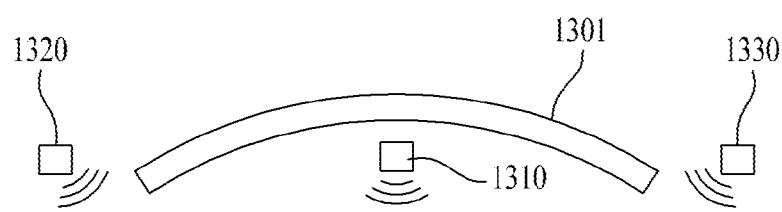
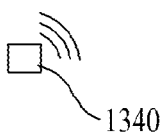
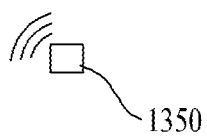

DISPLAY DEVICE HAVING DISPLAY SCREEN AND METHOD FOR CONTROLLING CURVATURE OF THE DISPLAY SCREEN

CROSS-REFERENCE TO RELATED APPLICATION

This application claims the benefit of the Korean Patent Application No. 10-2013-0095870, filed on Aug. 13, 2013, which is hereby incorporated by reference as if fully set forth herein.

BACKGROUND OF THE INVENTION

Field of the Invention

The present invention relates to a technology that can be applied to a display device receiving at least one or more curvature change signals and, more particularly, to a display device and a method for controlling the same, wherein a curvature of a display screen of the display device can be freely changed.

Discussion of the Related Art

A display device is essentially equipped with a flat screen. However, with the recent development of a flexible panel, display devices being equipped with a curved screen are being researched and developed. Herein, for example, the display device may correspond to a mobile phone, a smart phone, a computer, a tablet personal computer (tablet PC), a notebook (or laptop) computer, a netbook, a Television (TV), other broadcast receiving device, and so on. For example, a display device that can realize both a flat mode and a curved mode may be designed to enable a user to select a wanted (or desired) display mode in accordance with contents being displayed on the display device.

SUMMARY OF THE INVENTION

Accordingly, the present invention is directed to a display device and a method for controlling the same that substantially obviate one or more problems due to limitations and disadvantages of the related art.

An object of the present invention is to provide a display device and a method for controlling the same that can provide the user with an optimal graphical user interface (GUI), by generating a new GUI in accordance with a change in the curvature of the display device.

Another object of the present invention is to provide a display device and a method for controlling the same that are designed to enable the display device to sense position change information of the user and to automatically detect curvature change information, so as to enhance user convenience.

A further object of the present invention is to define a solution for gaining optimal sound effects (or audio effects) along with the newly generated GUI, by changing speaker output with respect to the curvature change of the display device.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a display device includes a receiving unit configured to receive a curvature change signal, a storage module configured to map curvature change information included in the received curvature change signal to graphical user interface (GUI) change data corresponding to the curvature change information and store the mapped result, a controller configured to control operations of the display, a display module configured to output at least one GUI on a display screen based upon a command of the controller, wherein, when the receiving unit receives a curvature change signal of the display screen outputting a first GUI, the controller is configured to change a curvature of the display screen based upon the received signal, extract GUI change data corresponding to the changed curvature of the display screen, to generate a second GUI based upon the extracted GUI change data, and output the generated second GUI on the display screen.

According to another exemplary embodiment of the present invention, a method for controlling a display device includes the steps of outputting a first GUI, receiving a curvature change signal of a display screen outputting the first GUI, changing a curvature of the display screen based upon the received signal, generating a second GUI based upon GUI change data corresponding to the changed curvature of the display screen, and outputting the generated second GUI on the display screen.

According to one embodiment of the present invention, it is able to provide a display device and a method for controlling the same that can provide the user with an optimal graphical user interface (GUI), by generating a new GUI in accordance with a change in the curvature of the display device.

According to a different embodiment of the present invention, it is able to provide a display device and a method for controlling the same that are designed to enable the display device to sense position change information of the user and to automatically detect curvature change information, so as to enhance user convenience.

According to a further different embodiment of the present invention, it is able to define a solution for gaining optimal sound effects (or audio effects) along with the newly generated GUI, by changing speaker output with respect to the curvature change of the display device.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 1 illustrates a block view showing an overall detailed structure of a configuration module of a display device according to an exemplary embodiment of the present invention;

FIG. 8 illustrates an example of changing a curvature of a display screen in the display device according to the exemplary embodiment of the present invention;

FIG. 10 illustrates an example of the display device according to the exemplary embodiment of the present invention obtaining curvature change information by sensing position information of the user;

FIG. 13 illustrates an example of having the display device according to the exemplary embodiment of the present invention change speaker output with respect to a curvature of the display screen;

DETAILED DESCRIPTION OF THE INVENTION

Figure 2A:
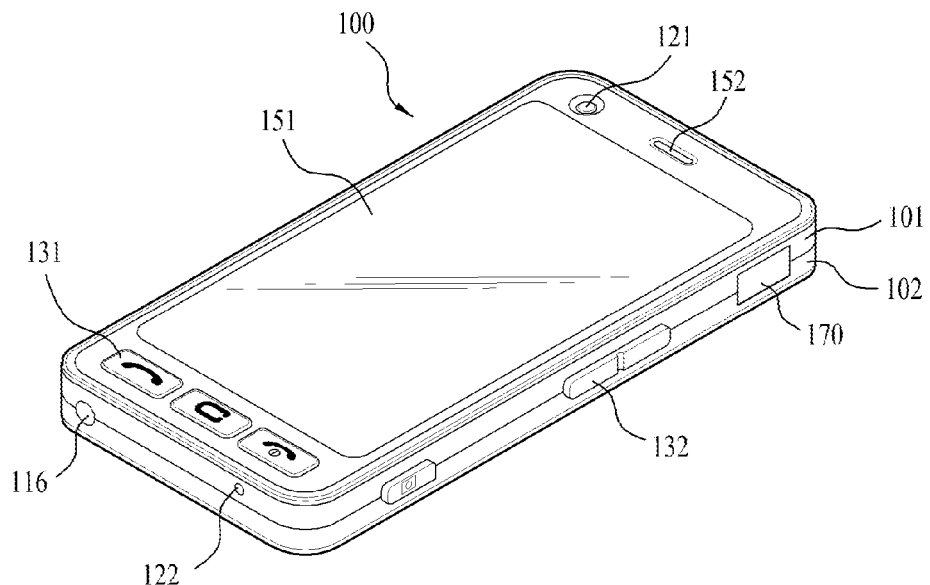
FIG. 2a illustrates a perspective view showing one side of outside features of the display device according to the exemplary embodiment of the present invention.

Reference will now be made in detail to the preferred embodiments of the present invention, examples of which are illustrated in the accompanying drawings. Wherever possible, the same reference numbers will be used throughout the drawings to refer to the same or like parts.

The present invention will now be described in more detail with reference to the accompanying drawings.

The suffixes "module" and "unit" that are mentioned in the elements used to describe the present invention are merely used for the purpose of simplifying the description of the present invention. Therefore, the suffixes "module" and "unit" may also be alternately used for the reference of a specific element of the present invention.

Additionally, icons that are shown in the appended drawings are merely exemplary icons given to facilitate and simplify the description of the present invention. Although the name of each icon is not shown in the drawings, the principles of the present invention will be equally applied even in case the drawings are marked with specific icon names.

Reference will now be made in detail to the preferred embodiments of the present invention, examples of which are illustrated in the accompanying drawings. However, the embodiment of the present invention described below may be modified to a wide range of modifications. And, therefore, it should be understood that the present invention will not be limited only to the example presented in the description of the present invention set forth herein.

In addition, although the terms used in the present invention are selected from generally known and used terms, the terms used herein may be varied or modified in accordance with the intentions or practice of anyone skilled in the art, or along with the advent of a new technology. Alternatively, in some particular cases, some of the terms mentioned in the description of the present invention may be selected by the applicant at his or her discretion, the detailed meanings of which are described in relevant parts of the description herein. Furthermore, it is required that the present invention is understood, not simply by the actual terms used but by the meaning of each term lying within.

Additionally, in the description of the present invention, the terms remote controller and remote may be alternately used for simplicity. However, unless mentioned otherwise, it will be apparent that the two terms will be interpreted as the same meaning.

FIG. 1 illustrates a block view showing an overall detailed structure of a configuration module of a display device according to an exemplary embodiment of the present invention.

The display device 100 may include a wireless communication unit 110, an Audio/Video (A/V) input unit 120, a user input unit 130, a sensing unit 140, an output unit 150, a memory 160, an interface unit 170, a controller 180, and a power supply unit 190. Since the elements shown in FIG. 1 are not the essential elements, a larger number of elements or a smaller number of elements may be used to configure the display device 100 according to the present invention.

Hereinafter, each element configuring the display device 100 will be described in detail.

The wireless communication unit 110 may include one or more modules establishing wireless communication between the display device 100 and a wireless communication system or establishing wireless communication between the display device 100 and a network, wherein another mobile device is located. For example, the wireless communication unit 110 may include a broadcast receiving module 111, a mobile communication module 112, a wireless internet module 113, a short range (or close range) communication module 114, and a position information module 115.

The broadcast receiving module 111 receives a broadcast signal and/or broadcast related information from an external broadcast management server through a broadcast channel.

Herein, the broadcast channel may include a satellite channel and a groundwave channel. The broadcast management server may refer to a server generating and transmitting a broadcast signal and/or broadcast related information, or the broadcast management server may also refer to a server receiving a broadcast signal and/or broadcast related information, which is generated in advance, thereby transmitting the received broadcast signal and/or broadcast related information to a user equipment (or user terminal). The broadcast signal may include TV broadcast signals, radio broadcast signals, and data broadcast signals, as well as a broadcast signals consisting of a combination of TV broadcast signals or radio broadcast signals with data broadcast signals.

The broadcast related information may refer to information related to a broadcast channel, a broadcast program, or a broadcast service provider. Herein, the broadcast related information may also be provided through a mobile communication network. In this case, the broadcast related information may be received by the mobile communication module 112.

The broadcast related information may exist in diverse formats. For example, the broadcast related information may exist in the form of an Electronic Program Guide (EPG) of a Digital Multimedia Broadcasting (DMB) system, or in the form of an Electronic Service Guide (ESG) of a Digital Video Broadcast-Handheld (DVB-H) system, and so on.

The broadcast receiving module 111 may receive a digital broadcast signal by using a digital broadcast system, such as a Digital Multimedia Broadcasting-Terrestrial (DMB-T) system, a Digital Multimedia Broadcasting-Satellite (DMB-S) system, a Media Forward Link Only (MediaFLO) system, a Digital Video Broadcast-Handheld (DVB-H) system, an Integrated Services Digital Broadcast-Terrestrial (ISDB-T) system, and so on. Evidently, the broadcast receiving module 111 may be configured to be applied to the above-described digital broadcasting system as well as other broadcasting systems.

The broadcast signal and/or broadcast related information that is received through the broadcast receiving module 111 may be stored in the memory 160.

The module communication module 112 transmits and/or receives a radio signal to and/or from at least one of a base station, an external device (or user equipment), and a server within a mobile communication network. The radio signal may include diverse data formats respective to the transmission and/or reception of voice call signals, video phone call signals or short text/multimedia messages.

The wireless internet module 113 refers to a module establishing wireless internet access. And, herein, the wireless internet module 113 may be embedded in the display device 100, or the wireless internet module 113 may be externally equipped to the display device 100. Also, Wireless LAN (WLAN) (or Wi-Fi), Wireless broadband (Wibro), World Interoperability for Microwave Access (Wimax), High Speed Downlink Packet Access (HSDPA), and so on, may be used as the wireless internet technology.

The short range module 114 refers to a module performing short range (or close range) communication. Herein, Bluetooth, Radio Frequency Identification (RFID), Infrared Data Association (IrDA), Ultra Wideband (UWA), ZigBee, and so on, may be used as the short range communication technology.

The position information module 115 corresponds to a module for acquiring information on the position of the display device 100. Herein, a main example of the position information module 115 corresponds to a Global Positioning System (GPS) module.

Referring to FIG. 1, the Audio/Video (A/V) input unit 120 corresponds to an element for performing audio signal input or video signal input. And, herein, the A/V input unit 120 may include a camera 121 and a microphone 122. The camera 121 processes an image frame, such as a still image or a moving picture image, which is obtained by an image sensor in a video phone mode or a video recording mode. The processed image frame may be displayed on the display unit 151.

The image frame that is processed by the camera 121 may be stored in the memory 160 or may be transmitted to an external target through the wireless communication unit 110. Moreover, depending upon the usage environment, the display device 100 may be equipped with two or more cameras 121.

The microphone 122 receives an audio signal from an external source in a phone call mode, a voice recording mode, or a voice recognition mode and, then, the microphone 122 processes the received audio signal to electrical audio data. In case the microphone 122 is being operated in the phone call mode, the processed audio data may be converted to a format that can be transmitted to a mobile communication base station through the mobile communication module 112, and the converted audio data then be outputted. Diverse noise removing algorithms may be implemented in the microphone 122 in order to remove noise, which may occur during the process of receiving audio signals from an external source.

The user input unit 130 generates input data enabling the user to control the operations of the display device 100. Herein, the user input unit 130 may be configured in the form of a key pad, a dome switch, a touch pad (static pressure type/capacitive), a jog wheel, a jog switch, and so on.

The sensing unit 140 senses the current state of the display device 100, such as an open and/or closed state of the display device 100, the position of the display device 100, the presence or absence of a user contact, bearings of the display device 100, acceleration and/or deceleration of the display device 100, and so on, and then generates a sensing signal for controlling the operations of the display device 100. For example, in case the display device 100 is a slider phone, the sensing unit 140 may sense whether the display device 100 is open or closed. Additionally, the sensing unit 140 may also sense whether or not power is being supplied from the power supply unit 190, whether or not an external device is combined with the interface unit 170. Meanwhile, the sensing unit 140 may include a short range sensor 141.

The output unit 150 may correspond to a unit for generating an output that is related to the visual sense, the auditory sense, the tactile sense (or haptic sense), and so on. Accordingly, the output unit 150 may include a display unit 151, an audio output module 152, an alarm unit 153, and a haptic module 154.

The display unit 151 displays (or outputs) information being processed by the display device 100. For example, in case the display device 100 is being operated in the phone call mode, the display unit 151 displays a user interface (UI) or a graphical user interface (GUI), which is associated with the respective phone call. In case the display device 100 is being operated in a video phone mode or a video recording mode, the display unit 151 displays a recorded image and/or a received image or a UI or a GUI.

The display unit 151 may include at least one of a liquid crystal display (LCD), a thin film transistor-liquid crystal display (TFT LCD), an organic light-emitting diode (OLED), a flexible display, and a three-dimensional display (3D display).

Among the diverse types of displays listed above, some of the displays may be configured as transparent displays or light-transmitting displays, through which the external environment can be seen. This may be referred to as transparent displays. Herein, a Transparent OLED (TOLED) may corresponds to a typical example of the transparent display. A rear end structure of the display unit 151 may be configured to have a light-transmitting structure. In accordance with such structure, the user may be capable of viewing the objects that are located behind the body of the display device (or display device body) through the area, which is occupied by the display device body.

Depending upon the implemented structure of the display device 100, two or more display units 151 may exist in the display device 100. For example, multiple display units may be positioned to be spaced apart from one another on a single surface or may be positioned as a single body. Alternatively, each of the multiple display units may also be positioned on different surfaces.

When the display unit 151 and a sensor sensing a touch motion (hereinafter referred to as a 'touch sensor') for an inter-layered structure (hereinafter referred to as a 'touch screen'), in addition to being used as an output device, the display unit 151 may also be used as an input device. The touch sensor may be configured as a touch film, a touch sheet, a touch pad, and so on.

The touch sensor may be configured to convert a change in a pressure level being applied to a specific area of the display unit 151, or a change in the capacitance occurring on a specific area of the display unit 151, and so on, to an electrical input signal. The touch sensor may be configured to detect not only the position or surface area of the display unit that is being touched but also the pressure level being applied to the display unit during the touch motion.

When a touch input respective to the touch sensor exists, the respective signal(s) is (are) delivered to a touch controller. After processing the signal(s), the touch controller transmits the respective data to the controller 180. Thus, the controller 180 may be capable of knowing (or recognizing) which are of the display unit 151 is being touched.

Referring to FIG. 1, a short range sensor 141 may be positioned in the internal area of the display device 100, which is covered (or enveloped) by the touch screen, or may be positioned within a short range of the touch screen. The short range sensor 141 refers to a sensor that can detect an object approaching a predetermined detecting surface of the corresponding sensor or that can detect the presence or absence of an object existing within a close proximity of the corresponding sensor, by using the intensity of an electro-magnetic field or infrared light rays without using any mechanical touch. Herein, the short range sensor has a longer durability and a wider range of application (or usage) as compared to a touch-type sensor.

Examples of the short range sensor may include a transmission photosensor, a direct reflection photosensor, a mirror reflection photosensor, a high-frequency oscillation-type proximity sensor, a capacitance proximity sensor, a magnetic-type proximity sensor, an infrared proximity sensor, and so on. When the touch screen is configured as an electrical static type touch screen, the approach of the pointer may be detected by a change in the electrical field respective to the short range approach of the pointer. In this case, the touch screen (touch sensor) may be categorized as a proximity sensor.

Hereinafter, for simplicity in the description of the present invention, an action having the sensor unit sense (or recognize) a proximate (or short range) positioning of a pointer to the touch screen without having the pointer actually touch the touch screen will be referred to as a "proximity touch", and an action having the pointer actually touch the touch screen will be referred to as a "contact touch". A position corresponding to the proximate touch of the pointer on the touch screen refers to a perpendicular position of the pointer respective to the touch screen, when the pointer proximately touches the touch screen.

The short range sensor senses a proximate touch and a proximate touch pattern (e.g., a proximate touch distance, a proximate touch direction, a proximate touch speed, a proximate touch time, a proximate touch position, movement status of a proximate touch, and so on). The information corresponding to the sensed proximate touch and proximate touch pattern may be outputted to the touch screen.

The audio output module 152 may output audio data, which are received from the wireless communication unit 110 during a call signal reception, or in a call-connection mode or a voice-recording mode, a voice recognition mode, a broadcast receiving mode, and so on, or which are stored in the memory 160. The audio output module 152 may also output a sound signal related to a function (e.g., a call signal reception tone, a message reception tone, and so on) performed by the display device 100. Such audio output module 152 may include a receiver, a speaker, a buzzer, and so on.

The alarm unit 153 outputs a signal for notifying the occurrence of an event in the display device 100. Examples of the events occurring in the display device 100 may include the reception of an incoming call signal, the reception of a message, the input of a key signal, the input of a touch, and so on. In addition to the forms of a video signal or an audio signal, the alarm unit 153 may also output, for example, a signal for notifying the occurrence of an event via vibration. Since the video signal or the audio signal may also be outputted through the display unit 151 or the audio output module 152, the display unit 151 or the audio output module 152 may be categorized as a part of the alarm unit 153.

The haptic module 154 generates diverse sensory effects that may be felt (or sensed) by the user. Herein, vibration may correspond to a typical example of the sensory effects being generated by the haptic module 154. The haptic module 154 may control the intensity and pattern of the generated vibration. For example, the haptic module 154 may output a combination of different vibrations or may sequentially output a series of different vibrations.

In addition to vibration, the haptic module 154 may generate diverse haptic effects, such as effects caused by a variety of stimulation, such as effects caused by an alignment of pins performing movements perpendicular to the contacting surface of the user's skin, air projection force or air suction force through a projection hole or a suction hole, flicker movement (or touch) on the surface of the user's skin, contact of electrodes, electrostatic force, effects caused by the realization of heat or coldness using a device that can absorb heat or generate heat, and so on.

The haptic module 154 may deliver haptic effects (or tactile or sensory effects) to the user via direct haptic (or tactile) contact. Moreover, the haptic module 154 may also be implemented so as to be capable of sensing the haptic effects through the muscular sensation (or kinesthetic sensation) of the user, such as the user's fingers or arm. Depending upon the configuration of the display device 100, two or more haptic modules 154 may be provided.

The memory 160 may store a program for the operations of the controller 180 and may temporarily store the data (e.g., phone book, message, still image, moving picture image, and so on). The memory 160 may store data related to diverse vibration patterns and sound, which are being outputted when a touch is inputted on the touch screen.

The memory 160 may include at least one type of storage means, such as a flash memory type, a hard disk type, a multimedia card micro type, a card-type memory (e.g., SD or XD memory), a Random Access Memory (RAM), a Static Random Access Memory (SRAM), a Read-Only Memory (ROM), an Electrically Erasable Programmable Read-Only Memory (EEPROM), a Programmable Read-Only Memory (PROM), a magnetic memory, a magnetic disk, and an optical disk. The display device 100 may operate in relation with a web storage, which performs the same storage function as the memory 160 over the internet.

The interface unit 170 performs the function of a path between the display device 100 and all external devices being connected to the display device 100. The interface unit 170 may receive data from the external devices, or may be supplied with power so as to deliver the supplied power to each element configuring the display device 100, or may transmit data within the display device 100 to the external devices. For example, a wired/wireless headset port, an external recharger port, a wired/wireless data port, a memory card port, an port for connecting a device being equipped within an identification module, an audio input/output (I/O) port, a video input/output (I/O) port, an earphone port, and so on may be included in the interface unit 170.

An identification module corresponds to a chip storing diverse information for certifying usage authority of the display device 100. Herein, the identification module may include a User Identity Module (UIM), a Subscriber Identity Module (SIM), a Universal Subscriber Identity Module (USIM), and so on. The device being equipped with an identification module may be produced in the form of a smart card. Accordingly, the identification device may be connected to the display device 100 through a port.

The interface unit 170 may perform the function of a path through which power being supplied from external cradles is supplied to the display device 100, when the display device 100 is connected to external cradles, and the interface unit may also perform the function of a path through which diverse command signals being inputted from the cradles are delivered to the display device 100. The diverse command signals or the power being inputted from the cradles may operate as signals for recognizing that the display device has been accurately mounted to (or connected to) the external cradles.

The controller 180 generally controls the overall operations of the display device 100. For example, the controller 180 performs control and processing functions associated with voice call connection, data communication, video-phone call connection, and so on. The controller 180 may also be equipped with a multimedia module 181 for multimedia playback. The multimedia module 181 may be implemented within the controller 180 or may be separately implemented from the controller 180.

The controller 180 may perform pattern recognition processing operations for recognizing writing input or drawing input performed on the touch screen and respectively processing the recognized inputs in the form of text and image.

The power supply unit 190 receives external power and internal power in accordance with the control of the controller 180 and, then, supplies the power required for the operations of each element.

The various embodiments of the present invention being described in the description set forth herein may be implemented in a recording medium that can be read by a computer or a similar device by using, for example, software, hardware, or a combination of software and hardware.

In case of implementing the embodiments of the present invention in the form of hardware, the embodiment of the present invention may be implemented by using at least one of ASICs (application specific integrated circuits), DSPs (digital signal processors), DSPDs (digital signal processing devices), PLDs (programmable logic devices), FPGAs (field programmable gate arrays), processors, controllers, micro-controllers, microprocessors, and electrical units performing other functions. In some cases, the embodiments described in the description of the present invention may be realized by the controller 180 itself.

In case of implementing the embodiments of the present invention in the form of software, the embodiments of the present invention corresponding to the procedures and functions described in the description of the present invention may be implemented as separate software modules. Herein, each of the software modules may perform at least one of the functions and operations described in the description of the present invention. A software code may be implemented by using a software application, which is written in an adequate programming language. The software code may be stored in the memory 160 and may be executed by the controller 180.

FIG. 2a illustrates a perspective view showing one side of outside features of the display device according to the exemplary embodiment of the present invention.

The display device 100 shown in FIG. 2a is provided with a bar-shaped device body. However, the present invention will not be limited only to the exemplary shape presented herein. And, therefore, the present invention may be applied to diverse structures, such as a slide type device, a folder type device, a swing type device, a swivel type device, and so on, wherein two or more movable bodies are connected to one another.

The body includes a case (casing, housing, cover, and so on) configuring the outside feature of the display device 100. According to the exemplary embodiment of the present invention, the case may be divided into a front case 101 and a rear case. Various types of electronic assembly parts are embedded in a space formed between the front case 101 and the rear case 102. At least one or more middle cases may be additionally positioned between the front case 101 and the rear case 102.

Each of the cases may be created by injecting synthetic resin or may be formed of a metallic material, such as stainless steel (STS) or Titanium (Ti).

A display unit 151, an audio output module 152, a camera 121, a user input unit 130/131 and 132, a microphone 122, an interface unit 170, and so on may be positioned in the device body, and more particularly in the front case 101.

The display unit 151 occupies most portion of main surface of the front case 101. The audio output module 152 and the camera 121 may be positioned at one end portion of the display unit 151, and the user input unit 131 and the microphone 122 may be positioned at another end portion of the display unit 151. The user input unit 132 and the interface unit 170 may also be positioned on side surfaces of the front case 101 and the rear case 102.

The user input unit 130 is manipulated (or operated) in order to receive a command for controlling the operations of the display device 100. Herein, the user input unit 130 may include multiple manipulating units 131 and 132. Herein, the manipulating units 131 and 132 may also be collectively referred to as manipulating portions. Any method that can manipulate the user input unit 130 in a tactile manner (i.e., allowing the user to feel a tactile sensation on the user input unit 130) may be adopted.

Contents (or commands) that are inputted through the first or second manipulating unit 131 or 132 may be diversely set up. For example, the first manipulating unit 131 may receive a command, such as Start, End, Scroll, and so on, and the second manipulating unit 132 may receive a command, such as Adjust audio volume or Shift operation mode of the display unit 151 to a Touch-recognition mode.

Figure 2B:
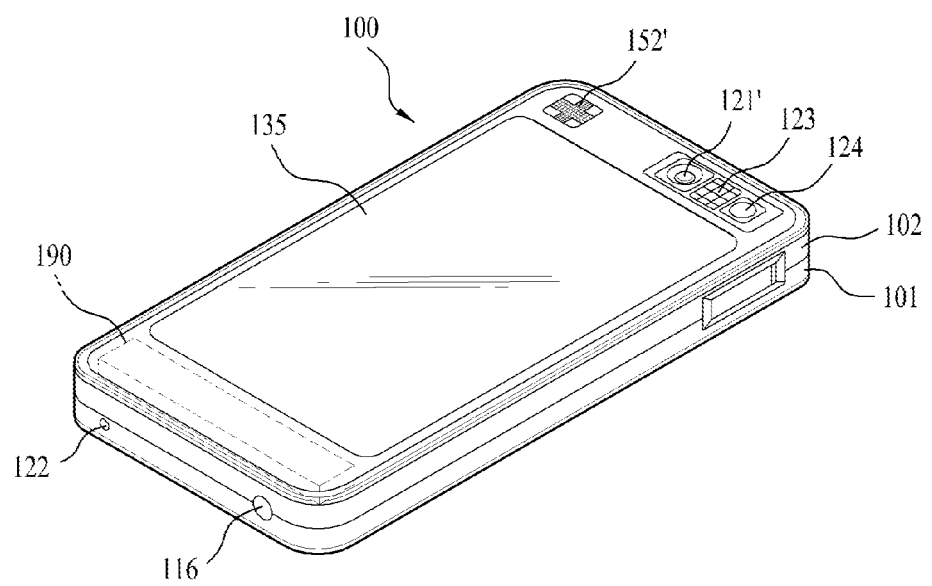
FIG. 2b illustrates a perspective view showing another side of outside features of the display device according to the exemplary embodiment of the present invention.

FIG. 2b illustrates a perspective view showing another side of outside features of the display device according to the exemplary embodiment of the present invention.

As shown in FIG. 2b, the rear side of the display device 100 body, i.e., the rear case 102 may be additionally equipped with a camera 121'. The camera 121' has a viewing (or recording) direction substantially opposite to that of the camera 121 (shown in FIG. 2a), and the camera 121' may correspond to a camera that has different pixels as compared to the camera 121 shown in FIG. 2a.

For example, it is preferable that the camera 121 shown in FIG. 2a has a lower pixel level, so that the user can easily capture (or record) his (or her) face and transmit his (or her) recorded face to a counterpart party (i.e., the person to whom the user is talking), when the user is carrying out a video phone call. Conversely, it is preferable that the camera 121' shown in FIG. 2b has a higher pixel level, since the user captures (or records) an image of a general object yet does not immediately transfer the captured image. The cameras 121 and 121' may be installed in the device (or user equipment) body, so as to be rotated or to pop up.

A flash 123 and a mirror 124 may be additionally positioned near the camera 121' shown in FIG. 2b. In case of taking the picture of an object by using the camera 121' shown in FIG. 2b, the flash 123 emits light on the corresponding object. And, when the user seeks to take a picture of himself (or herself) (a self-portrait) by using the camera 121' shown in FIG. 2b, the user see his (or her) reflection through the mirror 124.

An audio output unit 152' may be additionally positioned in the rear side of the display device 100 body. The audio output unit 152' shown in FIG. 2b may realize a stereophonic function along with the audio output unit 152 shown in FIG. 2a, and the audio output unit 152' may also be used for realizing a speaker phone mode when performing a phone call.

In addition to an antenna for performing a phone call, a broadcast signal receiving antenna 116 may be additionally positioned on a side surface of the display device 100 body. The antenna 116, which configures a portion of the broadcast receiving module 111 shown in FIG. 1, may be installed in the device body so as to be pulled out (or extended out) of the device body.

The device body is also equipped with a power supply unit 190 for supplying power to the display device 100. The power supply unit 190 may be embedded in the device body or may be detachably fixed to an external surface of the device body.

A touchpad 135 for detecting a touch motion may be additionally equipped to the rear case 102. Just as the display unit 151, the touchpad 135 may also be configured as a light-transmitting type. In this case, if the display unit 151 is configured to output visual information from both sides, the touchpad 135 may also be capable of recognizing the same visual information. The information being outputted to both sides may be collectively controlled by the touchpad 135. Alternatively, by additionally equipping the touchpad 135 with a display screen, a touch screen may also be positioned in the rear case 102.

Figure 3:
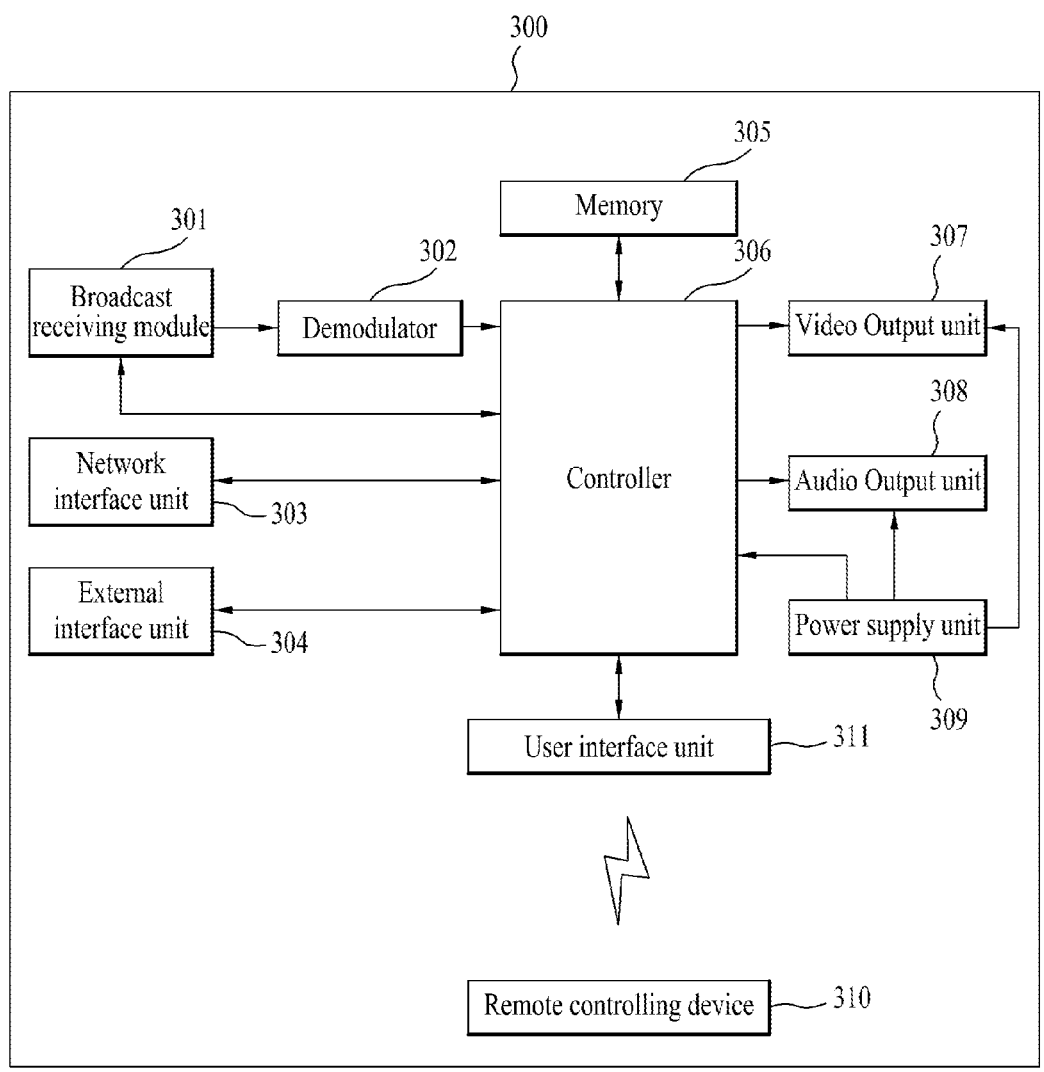
FIG. 3 illustrates a block view showing elements of the display device according to the exemplary embodiment of the present invention.

FIG. 3 illustrates a block view showing elements of the display device according to the exemplary embodiment of the present invention.

As shown in FIG. 3, the display device 300 according to another exemplary embodiment of the present invention consists of a broadcast receiving module 301, a demodulator 302, a network interface unit 303, an external device interface unit 304, a memory 305, a controller 306, a video output unit 307, an audio output unit 308, a power supply unit 309, a remote controlling device 310, and a user interface unit 311. Meanwhile, the display device 300 is designed to perform data communication with a remote controlling device 310, which corresponds to a remote controller. And, the remote controlling device will hereinafter be described as a remote controller, and the remote controller will be described in more detail later on with reference to FIG. 5 and FIG. 6.

The broadcast receiving module 301 may, for example, be designed as a radio frequency (RF) tuner, or may be designed as an interface capable of receiving broadcast data from an external device, such as an STB.

For example, the broadcast receiving module 301 may receive an RF broadcast signal of a single carrier respective to an Advanced Television System Committee (ATSC) method, or the broadcast receiving module 301 may receive an RF broadcast signal of a multi-carrier respective to a Digital Video Broadcasting (DVB) method.

The demodulator 302 receives a digital IF signal (DIF signal), which is converted in the broadcast receiving module 301, and then performs demodulation.

For example, in case the digital IF signal being outputted from the broadcast receiving module 301 corresponds to the ATSC method, the demodulator 302 may perform 8-Vestigal Side Band (8-VSB) demodulation. Additionally, the demodulator 302 may also perform channel decoding.

The external device interface unit 304 corresponds to an interface enabling data communication to be performed between an external device and the display device 300. The external device interface unit 304 may be connected to an external device, such as a Digital Versatile Disc (DVD) player, a Bluray player, a gaming device, a camera, a camcorder, a computer (or notebook (or laptop) computer), an STB, and so on, via wired and/or wireless connection. The external device interface unit 304 delivers (or transports) video, audio, or data signals being inputted from an external source to the controller 306, wherein the video, audio, or data signals are inputted through the external device being connected to the external device interface unit 304. Additionally, the external device interface unit 304 may also output the video, audio, or data signals, which are processed by the controller 306, to the external device.

Herein, for example, the external device interface unit 304 may include a USB terminal, a Composite Video Banking Sync (CVBS) terminal, a component terminal, an S-video terminal (analog), a Digital Visual Interface (DVI) terminal, a High Definition Multimedia Interface (HDMI) terminal, an RGB terminal, a D-SUB terminal, and so on.

The network interface unit 303 provides an interface for connecting the display device 300 to a wireless and/or wired network including the Internet. In order to establish access to a wired network, the network interface unit 303 may, for example, be equipped with an Ethernet terminal, and so on, and, in order to establish access to a wireless network, for example, diverse communication standards, such as Wireless LAN (WLAN (or Wi-Fi)), Wireless broadband (Wibro), World Interoperability Microwave Access (Wimax), High Speed Downlink Packet Access (HSDPA), and so on, may be used.

The network interface unit 303 may transmit or receiver data to or from another user or another electronic device through the accessed network or through another network being linked to the accessed network.

The memory 305 may store programs for signal processing and control in the controller 306, or the memory 305 may store signal-processed video, audio or data signals. Additionally, the memory 305 may also perform a function of temporarily storing video, audio or data signals being inputted from the external device interface unit 304 or from the network interface unit 303. Furthermore, for example, the memory 305 may also store diverse types of OS, middleware, and platforms.

The user interface unit 311 either delivers a signal inputted by the user to the controller 306, or the user interface unit 311 transmits the signal received from the controller 306 to an external device (e.g., the remote controlling device (or remote controller) 310). For example, in accordance with diverse communication methods, such as a Radio Frequency (RF) communication method, an Infrared (IR) communication method, and so on, the user interface unit 311 is designed to receive control signals corresponding to power on/off, channel selection, screen settings, and so on, from the remote controller 310 and to process the received control signals, or the user interface unit 311 is designed to transmit control signals received from the controller 306 to the remote controller 310.

The controller 306 may demultiplex a stream being inputted through the broadcast receiving module 301, the demodulator 302, the network interface unit 303, or the external device interface unit 304, or the controller 306 may process the demultiplexed signals, so as to create and output signals for video or audio output. The controller 306 will be described in more detail later on with reference to FIG. 4.

The video output unit 307 converts each of the video signal, data signal, OSD signal, and so on, which are processed by the controller 306, or converts each of the video signal, data signal, and so on, which are received from the external device interface unit 304, to R, G, B signals, so as to generate a Drive signal. The video output unit 307 may correspond to any one of a PDP, LCD, OLED, flexible display, 3-dimensional (3D) display, and so on.

The audio output unit 308 receives an audio-processed signal, which is processed by the controller 306, e.g., stereo signal, 3.1 channel signal, or 5.1 channel signal, and outputs the received signal as sound. Herein, the audio output unit 308 may be implemented as diverse forms of speakers.

Additionally, the power supply unit 309 supplies the corresponding power throughout the entire display device 300. More specifically, the power supply unit 309 may supply power to the controller 306, which may be implemented in the form of a System On Chip (SOC), and the power supply unit 309 may also supply power to the video output unit 307 for displaying images and to the audio output unit 308 for outputting audio (or sound).

Figure 4:
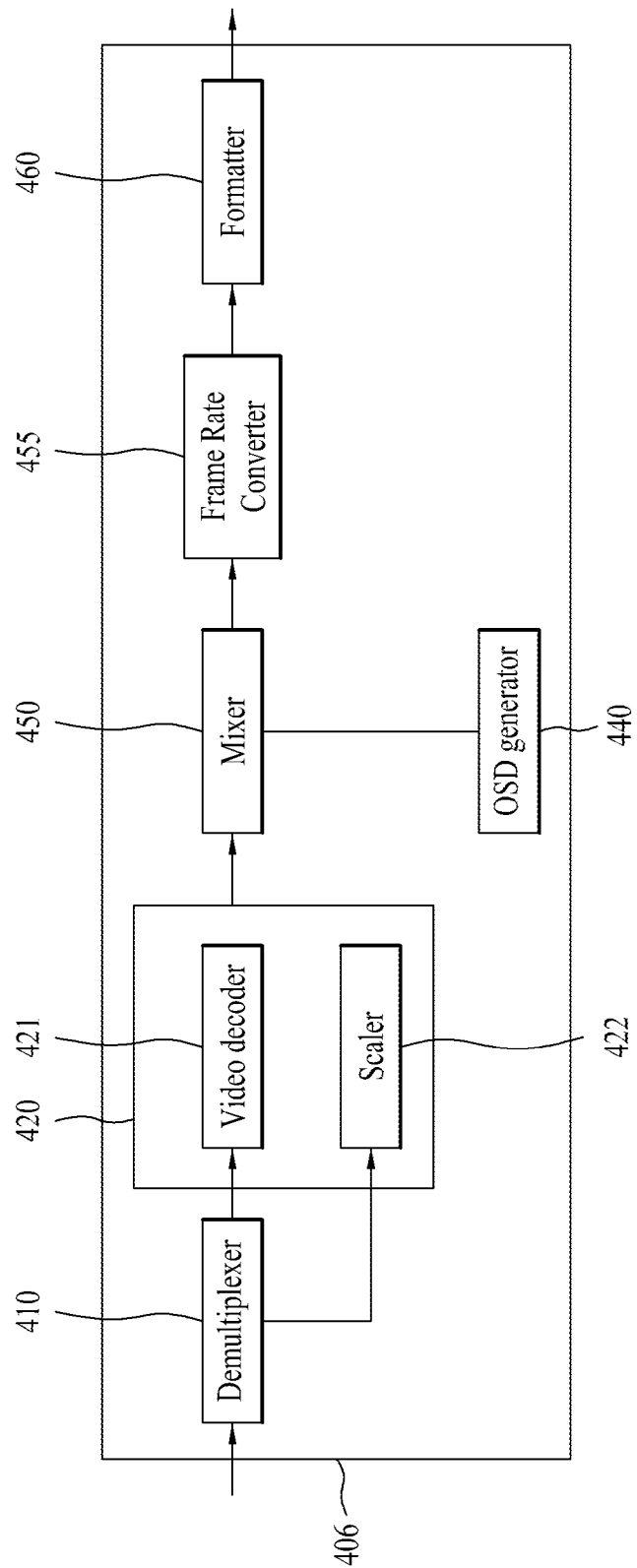
FIG. 4 illustrates a detailed block view of the controller shown in FIG. 3.

FIG. 4 illustrates a detailed block view of the controller shown in FIG. 3.

As shown in FIG. 4, the controller 406 of the display device includes a demultiplexer 410, an image processing unit 420, an OSD generator 440, a mixer 450, a frame rate converter 455, a formatter 460, and so on. Additionally, the scope of the present invention may also include designing the system, so that the display device can further include a sound processing unit (not shown) and a data processing unit (not shown).

The demutliplexer 410 demultiplexes an inputted stream. For example, when an MPEG-2 TS is inputted, the demultiplexer 310 demultiplexes the inputted MPEG-2 TS and may split (or divide) the demultiplexed MPEG-2 TS into image (or video), sound (or audio), and data signals.

The image processing unit 420 may perform image processing on the demultiplexed image signal. In order to do so, the image processing unit 420 may be equipped with an image decoder 421 and a scaler 422. The image decoder 421 decodes the demultiplexed image signal, and the scaler 422 performs scaling on the resolution of the decoded image signal, so that the decoded image signal can be outputted by the video output unit. Thereafter, the image signal that is decoded by the image processing unit 420 is inputted to the mixer 450.

The OSD generator 440 generates an OSD signal in accordance with the user's input or by itself. Accordingly, the mixer 450 may mix the OSD signal, which is generated from the OSD generator 440, and the decoded image signal, which is image-processed by the image processing unit 420.

The mixed signal is provided to the formatter 460. By mixing the decoded broadcast image signal or the externally inputted signal with the OSD signal, the OSD may be displayed by being overlaid on the broadcast image or the externally inputted image.

The frame rate converter (FRC) 455 may convert the frame rate of the image that is being inputted. For example, the FRC 455 may convert the frame rate of 60 Hz to 120 Hz or 240 Hz.

Additionally, the formatter 460 receives an output signal of the frame rate converter (FRC) 455. Thereafter, the formatter 460 may convert the signal format, so that the signal can be adequate for the video output unit, and may then output the converted signal. For example, the formatter 460 may output R, G, and B data signals, and such R, G, and B data signals may be outputted via low voltage differential signaling (LVDS) or mini-LVDS.

Figure 5:
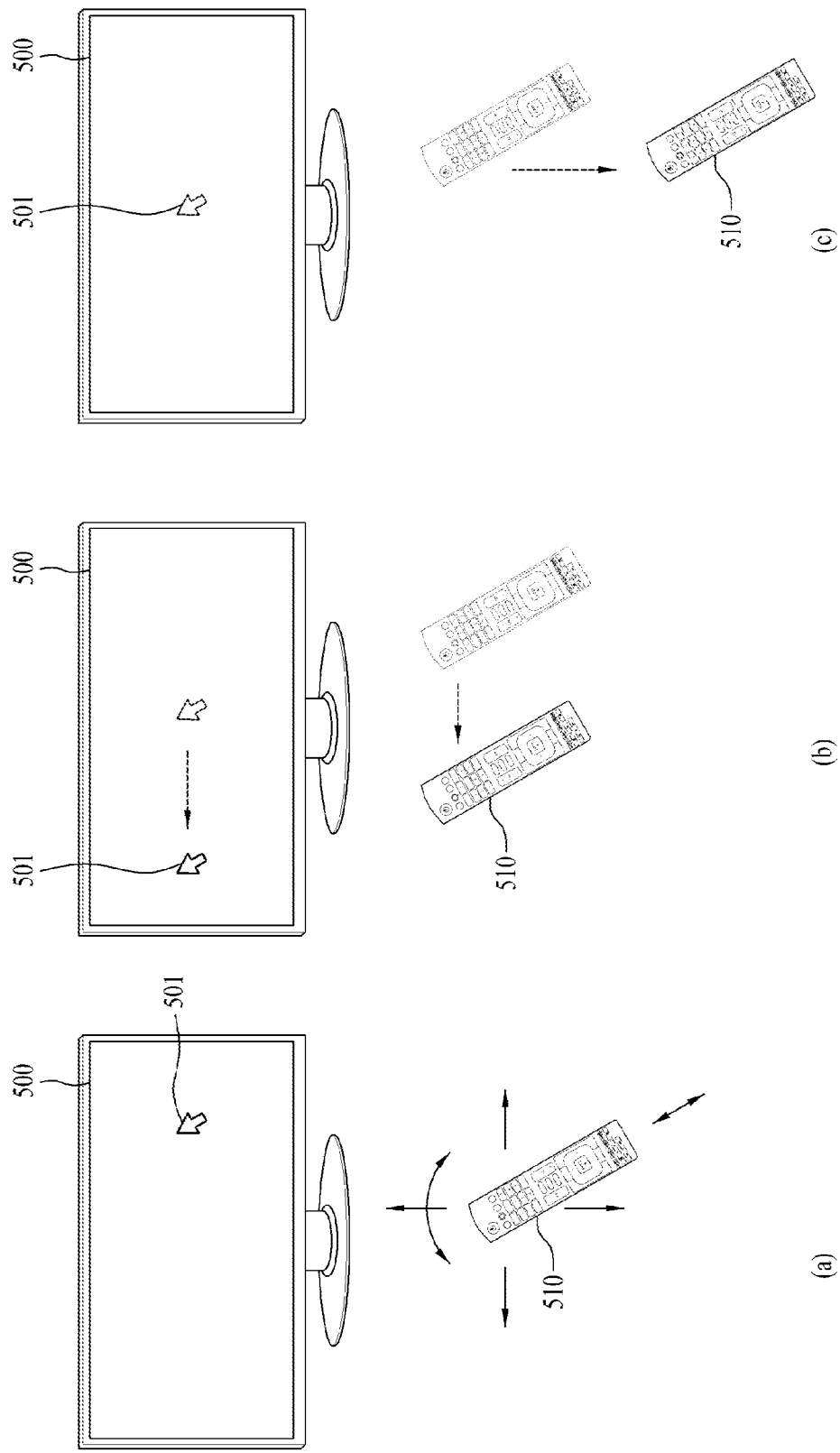
FIG. 5 illustrates outside features of a remote controller according to an exemplary embodiment of the present invention.

FIG. 5 illustrates outside features of a remote controller according to an exemplary embodiment of the present invention.

As shown in (a) of FIG. 5, a pointer 501 corresponding to movements of the remote controller 510 is displayed on a display screen of the display device 500. The user may move or rotate the remote controller 510 in a left-to-right (horizontal) direction (as shown in (b) of FIG. 5) and an up-and-down (vertical) direction (as shown in (c) of FIG. 5). Since the corresponding pointer 501 moves in accordance with the motion (or movement) of the remote controller 510 within a three-dimensional (3D) space, the above-described remote controller 510 may also be referred to as a space remote controller.

As shown in (b) of FIG. 5, when the remote controller 510 is moved leftward, the pointer 501 displayed on the display screen of the display device 500 also moves leftward with respect to the motion of the remote controller 510. Meanwhile, information on the motion of the remote controller 510, which is detected by a sensor of the remote controller 510, is transmitted to the display device 500. The display device 500 may calculate (or compute) coordinates of the pointer 501 from the received information on the motion of the remote controller 510. The display device 500 is designed to display the pointer 501 respective to the calculated coordinates.

Meanwhile, as shown in (c) of FIG. 5, when the user moves the remote controller 510 downward, the pointer 501 that is displayed on the display screen of the display device 500 is also moved downward.

Therefore, by using the remote controller 510 according to the exemplary embodiment of the present invention, the user may be capable of quickly selecting a specific section (or area) within the display screen of the display device 500.

Figure 6:
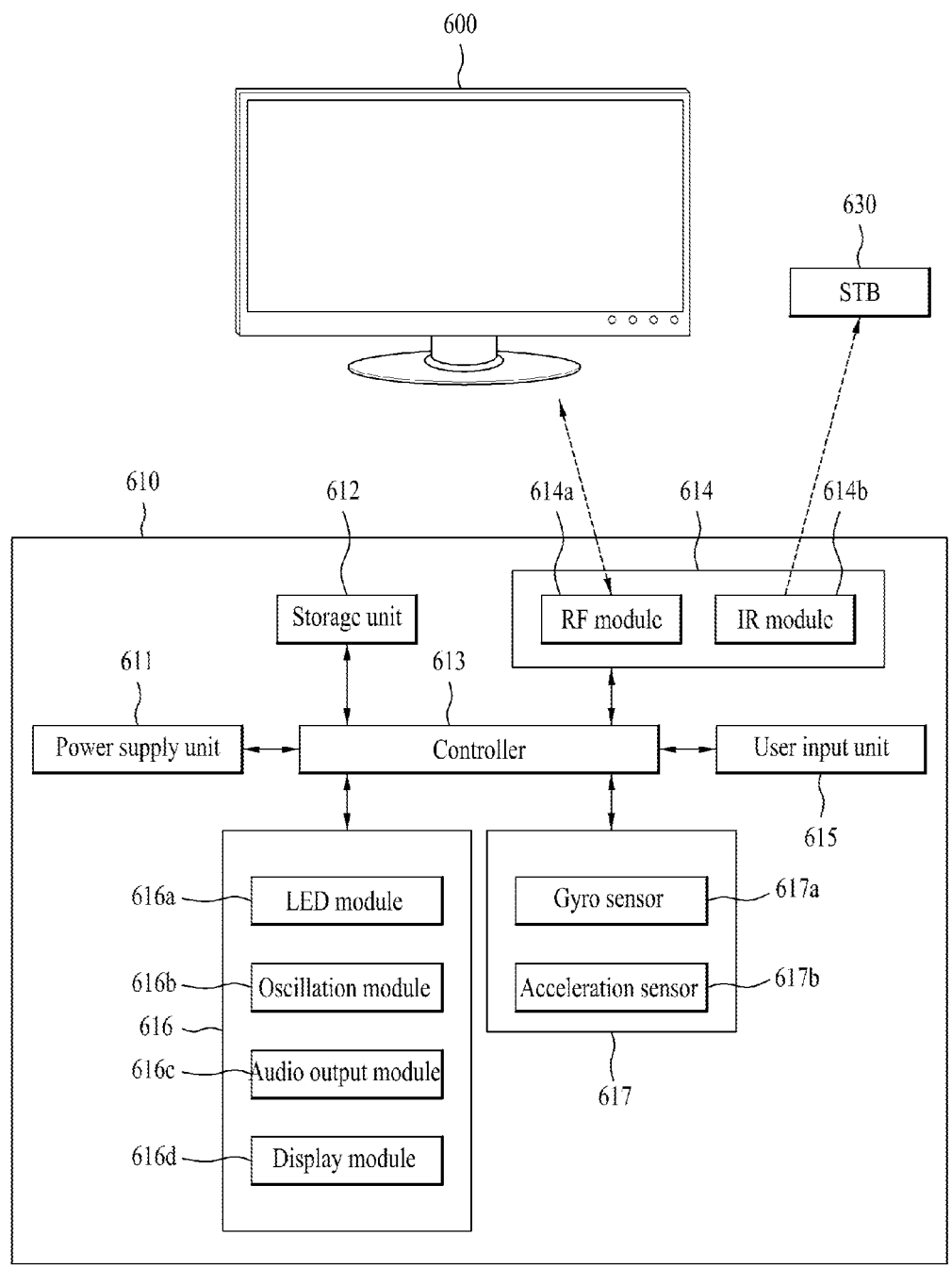
FIG. 6 illustrates a detailed block view showing elements of the remote controller shown in FIG. 5.

FIG. 6 illustrates a detailed block view showing elements of the remote controller shown in FIG. 5.

As shown in FIG. 6, the remote controller 610 includes a wireless communication unit 614, a user input unit 615, a sensor unit 617, an output unit 616, a power supply unit 611, a storage unit 612, and a controller 613.

The wireless communication unit 614 is designed to perform communication with an arbitrary (or random) external device. Most particularly, according to an exemplary embodiment of the present invention, an RF module 614a is designed to establish data communication with the display device 600, and an IR module 614b is designed to establish infrared communication with an external electronic device 630 (e.g., a set-top box (STB)).

Accordingly, the remote controller 610 may be implemented to be capable of performing the function of a relay station, which forwards an IR infrared code value that is received from the display device 600 to the STB 630.

Furthermore, according to the exemplary embodiment of the present invention, the remote controller 610 transmits signals carrying information on the motions of the remote controller 610 to the display device 600 through the RF module 614a.

Additionally, the remote controller 610 receives a signal, which is transmitted from the display device 600, through the RF module 614a. And, whenever required, the remote controller 610 may transmit commands associated with power on/off, channel change, volume change, and so on, to the display device 600 through the IR module 614b.

The user input unit 615 may be configured of a keypad, buttons, a touchpad, or a touchscreen.

Moreover, the sensor unit 617 may be equipped with a Gyro sensor 617a or an acceleration sensor 617b. Herein, the Gyro sensor 617a may sense information on the movements of the remote controller 610. For example, the Gyro sensor 617a may sense the information associated to the motions of the remote controller 610 based upon x, y, and z axises. And, the acceleration sensor 617b may sense information associated with a movement speed of the remote controller 610. Meanwhile, the acceleration sensor 617b may be further equipped with a distance measurement sensor. And, by using the distance measurement sensor, the acceleration sensor 617b may sense the distance between the remote controller 610 and the display device 600.

The output unit 616 may output a video signal or an audio signal either corresponding to the manipulation of the user input unit 615 or corresponding to the signal transmitted from the display device 600. For example, when the user input unit 616 is manipulated, or when a signal is transmitted and received to and from the display device 600 through the wireless communication unit 614, the output unit 616 may be provided with an LED module 616a that emits light when a signal is transmitted and/or received, an oscillation module 616b that generates oscillation, an audio output module 616c that outputs sound, or a display module 616d that outputs images.

The power supply unit 611 supplies power to each element of the remote controller 610. In case the remote controller 610 does not move for a predetermined period of time, by ceasing (or stopping) the power supply, the power supply unit 611 may be capable of reducing power from being wasted.

The storage unit 612 may store diverse types of programs, application data, and so on, which are required for controlling or operating the remote controller 610. Finally, the controller 613 performs the overall functions associated with the control of the remote controller 610. Herein, the controller 613 may transmit a signal corresponding to a predetermined key manipulation of the user input unit 615 or a signal corresponding to the movements of the remote controller 610, which is sensed by the sensor unit 617, to the display device 600 or the STB 630 through the wireless communication unit 614.

Meanwhile, the display device 600 shown in FIG. 6 may also be referred to as a multimedia device. And, it will be apparent that the scope of the present invention will not be limited to having all of the elements of the remote controller 610 shown in FIG. 6 included in the present invention. Moreover, icons being displayed on the display module of the present invention may be selected by using the remote controller 610 or may be selected by using a touch method without using the remote controller 610.

Figure 7:
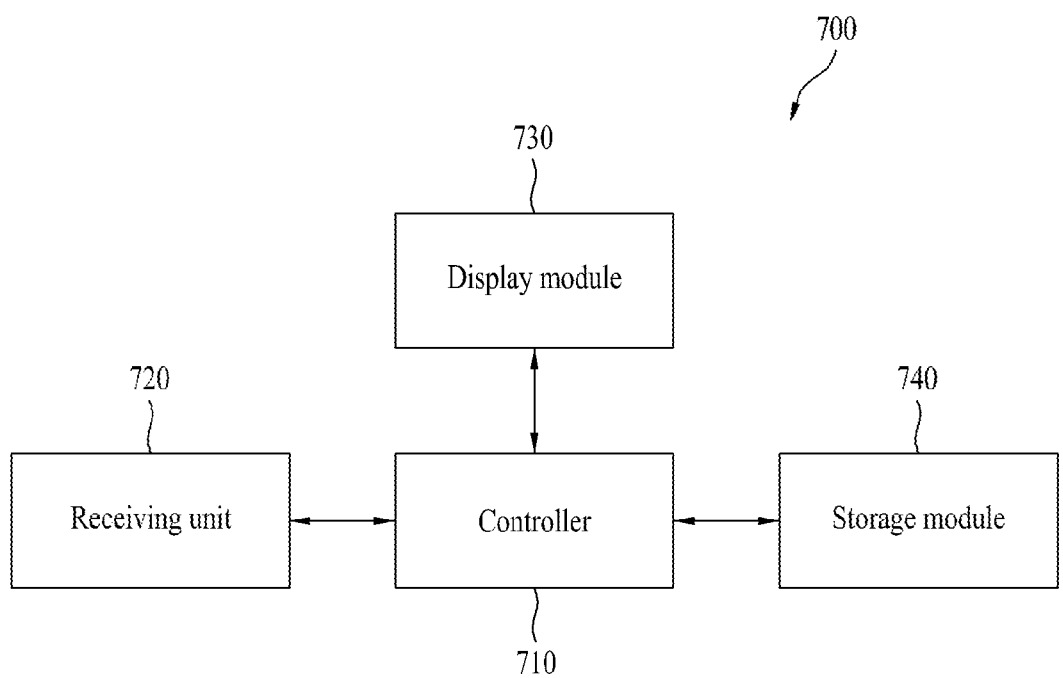
FIG. 7 illustrates a detailed block view showing a configuration module of the display device according to an exemplary embodiment of the present invention.

FIG. 7 illustrates a detailed block view showing a configuration module of the display device according to an exemplary embodiment of the present invention. Herein, some of the modules of the display device shown in FIG. 7 may be added or modified (or varied), with reference to the FIG. 1 to FIG. 6 described above. However, the scope of the present invention will not be decided based upon the elements described above in FIG. 1 to FIG. 7, and, by principle, the scope of the present invention should be decided based upon the appended claims of the present invention and not based upon the examples shown in FIG. 1 to FIG. 7.

As shown in FIG. 7, the display device 700 according to the exemplary embodiment of the present invention is configured by including a controller 710, a receiving unit 720, a display module 730, and a storage module 740. However, some of the modules may be newly added or omitted (or removed) whenever required by anyone skilled in the art, and, by principle, the scope of the present invention shall be decided based upon what is claimed in the description of the present invention.

The receiving unit 720 may receive a curvature change signal requesting for a change in the curvature of the display screen in the display device 700. Additionally, by using the camera included in the display device 700, the receiving unit 720 may receive a signal that has sensed position change information of a specific user. And, then, the receiving unit 720 may transmit (or deliver) the received position change information of the specific user to the controller. According to the exemplary embodiment of the present invention, the receiving unit 720 may correspond to the sensing unit 140, which is described above with reference to FIG. 1. And, according to another exemplary embodiment of the present invention, the receiving unit 720 may correspond to the user interface unit 311, which is described above with reference to FIG. 3.

The display module 730 is designed to output at least one or more application GUIs on the display screen. And, the display module 730 may correspond to a display unit, a display module, a screen outputting device, and so on, which is equipped with to a mobile phone, a smart phone, a computer, a tablet PC, a notebook (or laptop) computer, a netbook, a Television (TV), and other broadcast receiving devices that can display icons, launcher icons, applications, GUIs, and so on. According to the exemplary embodiment of the present invention, the display module 730 may correspond to the display unit 151, which is included in the output unit 150 described above with reference to FIG. 1. And, according to another exemplary embodiment of the present invention, the display module 730 may correspond to the video output unit 307 described above with reference to FIG. 3.

The storage module 740 stores GUI change data corresponding to a curvature of the display screen, and the GUI change data are mapped to a table for each curvature and then stored. Herein, the GUI change data are stored in a database in a table format. According to an exemplary embodiment of the present invention, the storage module 740 may correspond to the memory 160, which is described above with reference to FIG. 1. And, according to another exemplary embodiment of the present invention, the storage module 740 may corresponds to the memory 305, which is described above with reference to FIG. 3.

The controller 710 performs a function of controlling the overall functions of at least one of the modules shown in FIG. 7, such as the receiving module 720, the display module 730, the storage module 740, and so on.

FIG. 8 illustrates an example of changing a curvature of a display screen in the display device according to the exemplary embodiment of the present invention.

When the receiving unit receives a curvature change signal of the display screen outputting a first GUI, the controller is configured to change a curvature of the display screen based upon the received signal, extract GUI change data corresponding to the changed curvature of the display screen, to generate a second GUI based upon the extracted GUI change data, and output the generated second GUI on the display screen.

As shown in (a) of FIG. 8, the display device 800 according to the exemplary embodiment of the present invention outputs a first GUI 801, when the display screen is in a flat mode 810. Thereafter, when the receiving unit receives a curvature change signal, which requests for a change in the curvature of the display screen having the first GUI 801 displayed thereto, through an external inputting means or an internal (or embedded) inputting means, the curvature of the display screen is changed based upon the received curvature change signal, as shown in (b) of FIG. 8. Subsequently, in order to output (or display) a GUI that is optimized for the display screen that has shifted (or changed) from the flat mode 810 to a curved mode 820, the controller accesses the storage module so as to extract GUI change data respective to the change curvature of the display screen. Afterwards, the controller generates a second GUI 802 based upon the extracted GUI change data and then displays the newly created second GUI 802 on the display screen. The curvature of the display screen refers to a degree (or level) of a curved state of the display screen. Herein, the flat mode 810 refers to a state when the curved state of the display screen is equal to 0, just as the conventional display device. And, the curved mode 820 refers to a state when the curved state of the display screen is greater than 0. In the curved mode 820, the display screen may have a curvature equivalent to that of the display screen of an IMAX movie theater. The user may adjust the level of the curved state of the display screen. And, in order to obtain an optimized image in accordance with a specific content, the display screen may be adjusted to have diverse curvatures. When the user inputs a signal changing the mode of the display screen from the flat mode 810 to the curved mode 820, a curvature change signal is generated. Then, when the generated curvature change signal is received, the controller of the display device 800 changes the curvature of the display screen based upon the received curvature change signal.

Figure 9:
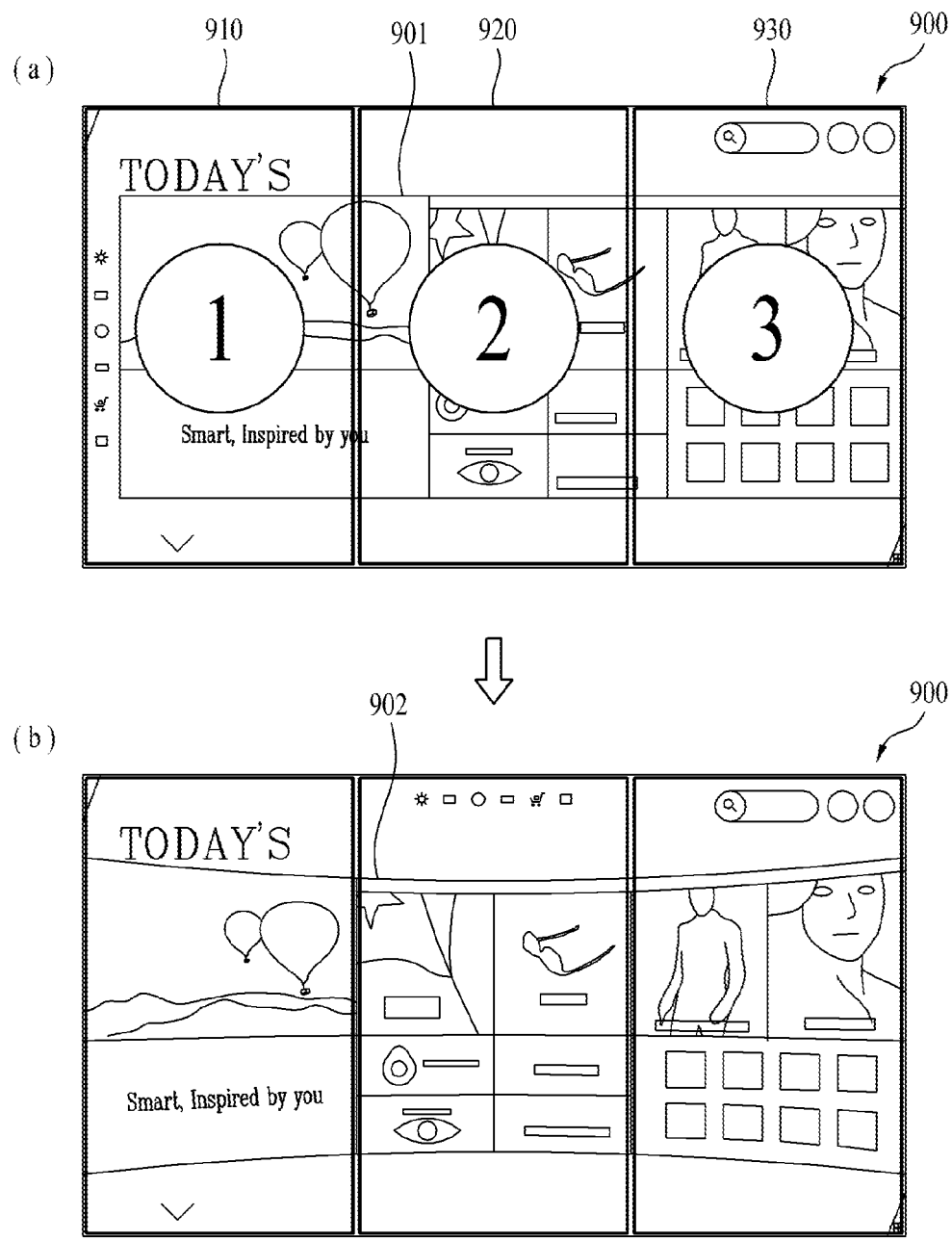
FIG. 9 illustrates another example of changing a curvature of a display screen in the display device according to the exemplary embodiment of the present invention.

FIG. 9 illustrates another example of changing a curvature of a display screen in the display device according to the exemplary embodiment of the present invention.

As shown in FIG. 9, the display device 900 according to the exemplary embodiment of the present invention may be designed to display (or output) a first GUI 901 in the flat mode, and, when the receiving unit receives a curvature change signal, to display (or output) a second GUI 902 in the curved mode, wherein the curvature of the display screen is changed. The second GUI 902 is created (or generated) by modifying the first GUI 901 based upon GUI change data corresponding to the changed curvature of the display screen. The GUI change data are mapped to each curvature in a table format and stored in the database of the storage module. Thereafter, the second GUI 902 is generated (or created) based upon different sets of GUI change data respective to each curvature. For example, as shown in (a) of FIG. 9, when the display device 900 receives a curvature change signal, the curvature of the display screen is changed based upon the received curvature change signal. Subsequently, the first GUI 901 is divided into a first section 910, a second section 920, and a third section 930 based upon the GUI change data corresponding to the changed curvature of the display screen. Accordingly, the three divided sections are reconfigured, so as to newly create the second GUI 902. Finally, the newly created second GUI 902 is outputted (or displayed) to the display screen. More specifically, the display device 900 according to the exemplary embodiment of the present invention outputs the first GUI 901 in the flat mode. And, when a curvature change signal is received through the receiving unit, the display device 900 shifts from the flat mode to the curved mode, and the first GUI 901 may perform a UI reconfiguration procedure in accordance with the first section 910, the second section 920, and the third section 930. At this point, the curved effect may be small in the first section 910 and third section 930, and the curved effect may be large in the second section 920. More specifically, the size of the curved effect may vary in each section of the first GUI 901. Additionally, after performing the UI reconfiguration procedure, the display device 900 according to the exemplary embodiment of the present invention may generate (or create) a second GUI 902 based upon the GUI change data and may output the generated second GUI 902. During the UI reconfiguration procedure, the configuration of the menus belonging to the conventional first GUI 901 may vary. For example, the Quick menu, which is located in the left side section of the first GUI 901 in the flat mode, may be located in an upper section of the second GUI 902 in the curved mode. The Quick menu may include brightness adjustment, which may be frequently used in the curved mode, or may include an icon allowing direct entry to curved mode recommendation contents. Brightness adjustment function can adjust brightness of each section separately (910,920,930). Second GUI can include a link of contents which is good to watch in curved mode.

In case of designing the display device according to the exemplary embodiment of the present invention as shown in FIG. 8 and FIG. 9, the user may be capable of personally selecting the curved level (or degree) of the display screen, and a GUI optimized for a curved screen may be provided.

FIG. 10 illustrates an example of the display device according to the exemplary embodiment of the present invention obtaining curvature change information by sensing position information of the user.

When the receiving unit receives a curvature change signal of the display screen outputting a first GUI, the controller is configured to detect position change information of a specific user, and obtain curvature change information corresponding to the detected position change information of the specific user.

As shown in (a) FIG. 10, the controller of the display device 1000 according to the exemplary embodiment of the present invention detects position change information of a specific user by using a sensor, such as a Time of Flight (TOF) camera, which is included in the display device 1000. More specifically, the display device 1000 may detect that the user has shifted (or moved) his (or her) position from a first position 1010 to a second position 1020. Thereafter, as shown in (b) and (c) of FIG. 10, when the user views the display screen in the flat mode 1030 in the first position 1010 and then shifts (or moves) to the second position 1020, the controller of the display device 1000 detects the position change information of the user with respect to such movement (or shift in position) and obtains curvature change information respective to the detected position change information of the user. Thereafter, with respect to the obtained curvature change information, the controller of the display device 1000 changes the flat mode 1030 of the display screen to the curved mode 1040 of the display screen. More specifically, in order to allow the user, who has moved to the second position 1020, to use the display device 1000 in a more pleasant viewing environment, the controller of the display device 1000 may acquire adequate curvature change information, so as to change the curvature of the display screen accordingly. More specifically, by receiving the curvature change signal transmitted by the user, the display device 1000 according to the exemplary embodiment of the present invention may be designed to be capable of detecting the user's position change information, which corresponds to the user's shift from the first position 1010 to the second position 1020, so as to change the curvature of the display screen. Alternatively, by detecting the real-time position of the user by using a sensor, such as a TOF camera included in the display device 1000, the display device 1000 according to the exemplary embodiment of the present invention may also be designed to be capable of detecting the user's position change information, which corresponds to the user's shift from the first position 1010 to the second position 1020, so as to automatically change the curvature of the display screen.

In case the display device according to the exemplary embodiment of the present invention is designed as described above, it will be advantageous in that, by automatically changing the curvature of the display screen, an optimal viewing environment may be more swiftly provided.

Figure 11:
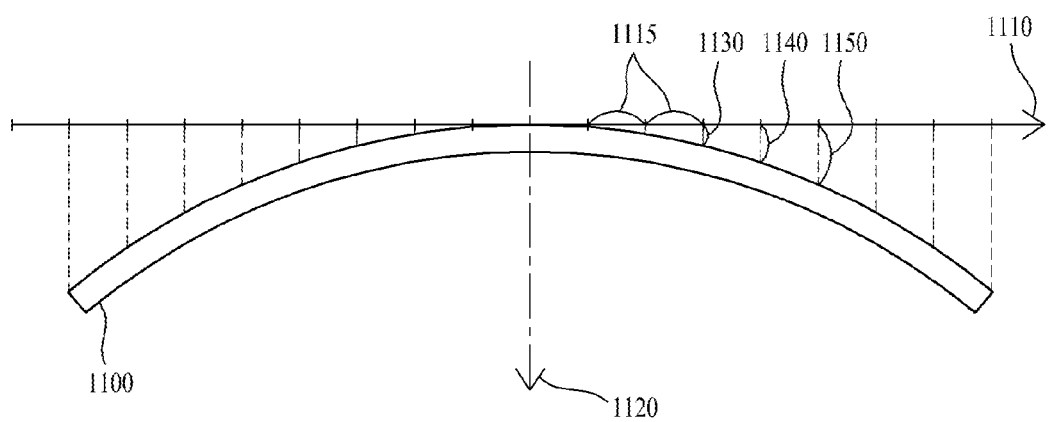
FIG. 11 illustrates a method of obtaining curvature of the display device according to the exemplary embodiment of the present invention.

FIG. 11 illustrates a method of obtaining curvature of the display device according to the exemplary embodiment of the present invention.

In case the curvature of the display screen is changed based upon the received signal, the controller of the display device 1100 according to the exemplary embodiment of the present invention controls the display device 1100, so that the changed curvature of the display screen can be obtained. Then, when the changed curvature of the display screen is obtained, the controller is configured to calculate a change of a length in a second direction 1120 corresponding to a unit length 1115 of a first direction 1110 of the display screen.

As shown in FIG. 11, the display screen of the display device 1100 according to the exemplary embodiment of the present invention has diverse curvature information in the curved mode. Herein, the curvature may be freely changed by the user. And, in case the curvature of the display screen is obtained, after calculating a first length 1130, a second length 1140, a third length 1150, and so on, of the second direction 1120 respective to the unit length 1115 of the first direction 1110 of the display screen, a first length difference between the first length 1130 and the second length 1140 and a second length difference between the second length 1140 and the third length 1150 are calculated. Thereafter, a difference between the first length difference and the second length difference is calculated. When the display screen is in the flat mode, and when setting up the basic set-up value of the display device 1100, a total length of the first direction 1110 of the display screen is divided into 10,000 length units (i.e., one length unit corresponding to one ten thousandth (¹⁄₁₀,₀₀₀) of the total length). And, each divided unit is determined as a unit length 1115 of the first direction 1110. Accordingly, the controller of the display device 1100 calculates the curvature of the display screen by using the above-described calculation method.

In case the display device 1100 according to the exemplary embodiment of the present invention is designed as described above, it may be advantageous in that the curvature of the display screen may be calculated with a more precise accuracy by using an extremely short unit length.

Figure 12:
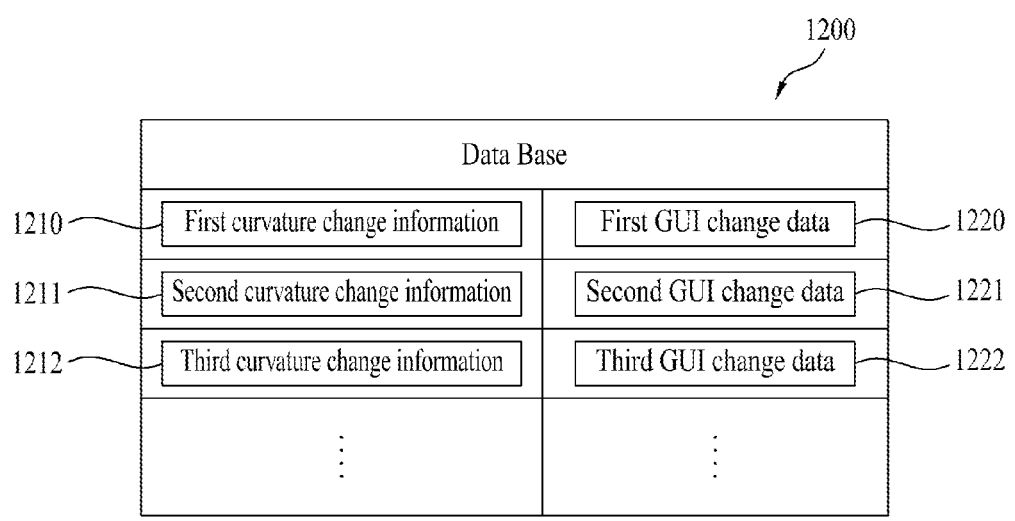
FIG. 12 illustrates an example of having the display device according to the exemplary embodiment of the present invention map GUI change data respective to each curvature to a table and having the display device store the mapped result.

FIG. 12 illustrates an example of having the display device according to the exemplary embodiment of the present invention map GUI change data corresponding to each curvature to a table and having the display device store the mapped result.

As shown in FIG. 12, the display device according to the exemplary embodiment of the present invention maps multiple sets of GUI change data corresponding to each curvature to one another and stores the mapped GUI change data in a database 1200 of the storage module in a table format. For example, in case a first curvature change information 1210 is received, the controller of the display device extracts first GUI change data 1220, and, in case a second curvature change information 1211 is received, the controller of the display device extracts second GUI change data 1221, and, in case a third curvature change information 1213 is received, the controller of the display device extracts third GUI change data 1222. Accordingly, when the display device according to the exemplary embodiment of the present invention is designed as described above, it may be advantageous in that, when the display device receives a curvature change signal, the GUI change data may be swiftly extracted from the storage module.

FIG. 13 illustrates an example of having the display device according to the exemplary embodiment of the present invention change speaker output with respect to a curvature of the display screen.

When a second GUI is generated based upon GUI change data corresponding to the changed curvature of the display screen, the controller is configured to change speaker output of the display device corresponding to the changed curvature of the display screen.

As shown in FIG. 13, in case the display screen of the display device is in the flat mode 1300, the controller of the display device sets up the output direction of all of a front center speaker 1310, a front left speaker 1320, a front right speaker 1330, a rear left speaker 1340, and a rear right speaker 1350 to be directed forward. Then, in case the curvature of the display screen is changed, and, therefore, if the display screen of the display device is shifted to the curved mode 1301, the controller of the display device sets up the output direction of all of the front center speaker 1310, the front left speaker 1320, the front right speaker 1330, the rear left speaker 1340, and the rear right speaker 1350 to be directed toward the center of the multi-channel speaker system. More specifically, since the display screen operating in the curved mode 1301 has the shape of a half moon, and since an image outputting direction of the display screen is set to a central direction, just as an antenna satellite, the output of the speaker is also set to be directed to the same direction. In case the display screen of the display device is designed as described above, since the user of the display device is capable of using different curvatures of the display screen for each content, and, at the same time, since the output of the speaker is also modified to provide the same effects, the user's satisfaction level may be increased.

Figure 14:
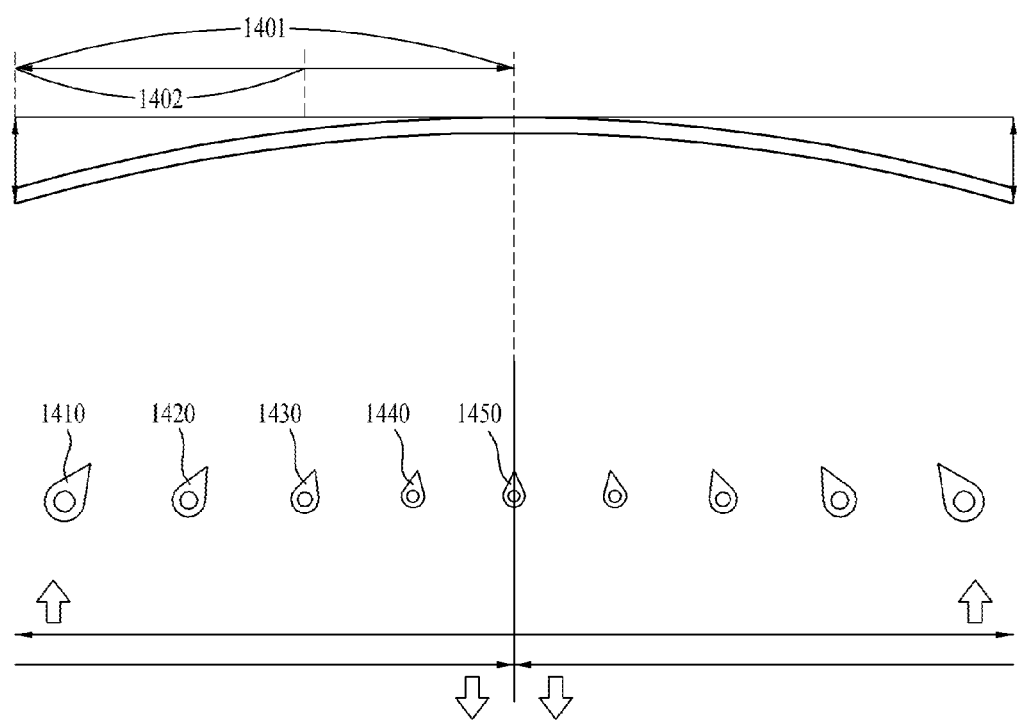
FIG. 14 illustrates an example of having the display device according to the exemplary embodiment of the present invention change a size and angle of a pointer with respect to a curvature of the display screen.

FIG. 14 illustrates an example of having the display device according to the exemplary embodiment of the present invention change a size and angle of a pointer with respect to a curvature of the display screen.

When a second GUI is generated based upon GUI change data corresponding to the changed curvature of the display screen, the controller is configured to change size and angle of a pointer of an external inputting means connected to the display device corresponding to the changed curvature of the display screen.

As shown in FIG. 14, in case the curvature of the display screen is changed, and, therefore, if the display screen is shifted (or changed) from the flat mode to the curved mode 1400, the controller of the display device according to the exemplary embodiment of the present invention controls the display device, so that the size and angle of a pointer of an external inputting means, which is connected to the display device, can be changed with respect to the changed curvature of the display screen. Even in case of changing the size and angle of the pointer of the external inputting means, the change (or modification) is performed based upon the GUI change data. For example, each of a first pointer 1410, a second pointer 1420, a third pointer 1430, a fourth pointer 1440, and a fifth pointer 1450 has a different size and a different angle, and, when the display screen is in the curved mode, the third pointer 1430 respective to a portion corresponding to a mid-point 1402 of a left-side (or left half) length 1401 of the display screen has the same size of the pointer of the display screen being in the flat mode. And, with respect to the third pointer 1430, the first pointer 1410 and the second pointer 1420, which are located on the left side of the third pointer 1430, are increased to be a predetermined size larger than the third pointer 1430. And, with respect to the third pointer 1430, the fourth pointer 1440 and the fifth pointer 1450, which are located on the right side of the third pointer 1430, are decreased to be a predetermined size smaller than the third pointer 1430. Additionally, with respect to the fifth pointer 1450, which corresponds to a mid-point of the display screen, each of the first pointer 1410, the second pointer 1420, the third pointer 1430, and the fourth pointer 1440 is rotated (or tilted) by a predetermined angle, so as to point to the center (or mid-point) of the display screen. The size and angle of each pointer become larger as the curvature of the display screen being in the curved mode 1400 becomes larger. And, the size and angle of each pointer become smaller as the curvature of the display screen being in the curved mode 1400 becomes smaller. Herein, when the display device is designed as described above, it may be advantageous in that, in the position of the user, who is viewing the display screen in the curved mode, the pointer can be maintained to have a consistent form (or shape).

Figure 15:
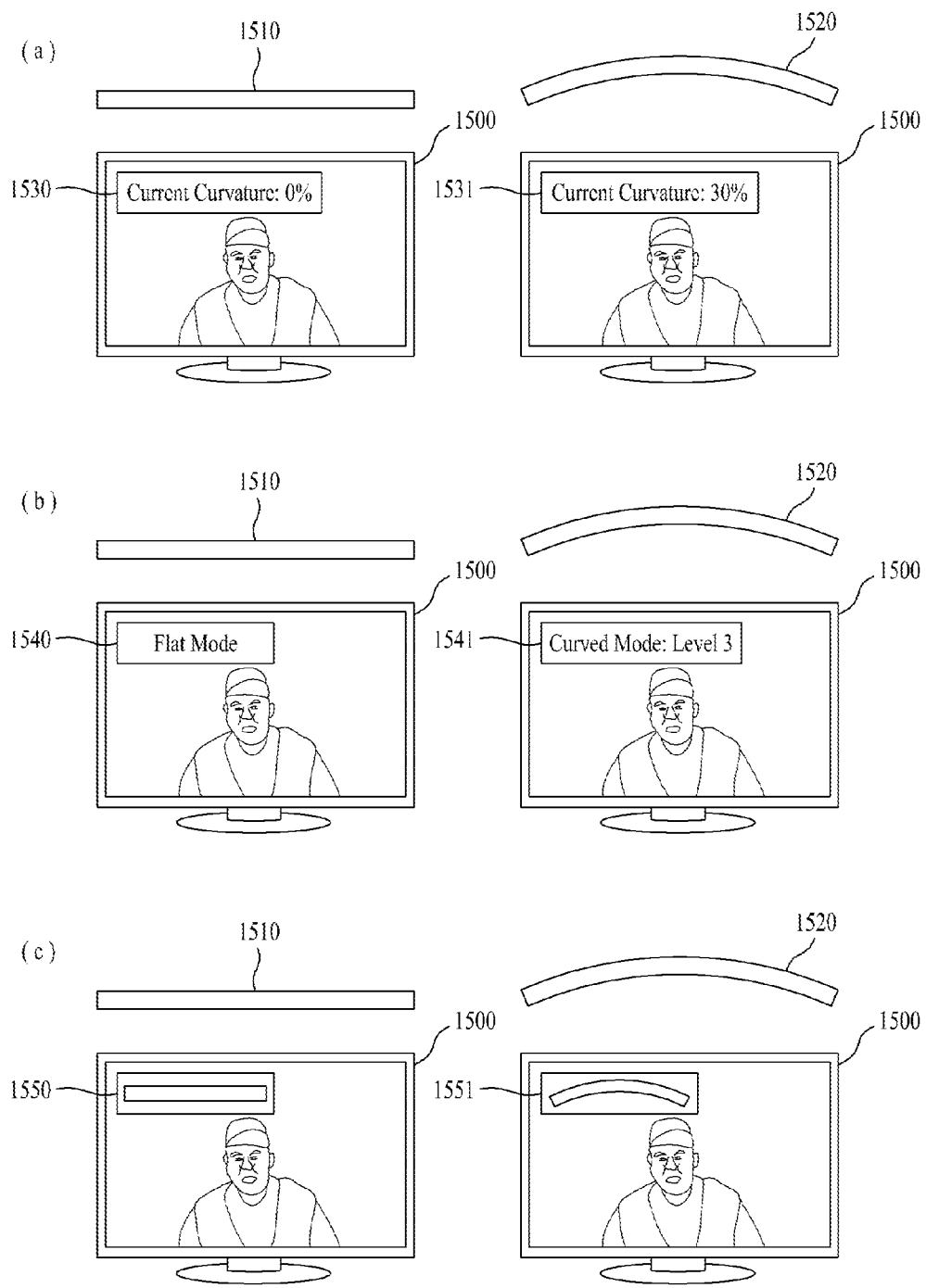
FIG. 15 illustrates an example of having the display device according to the exemplary embodiment of the present invention output an indicator respective to curvature change information on a specific section of the display screen.

FIG. 15 illustrates an example of having the display device according to the exemplary embodiment of the present invention output (or display) an indicator respective to curvature change information on a specific section of the display screen.

When the generated second GUI is outputted on the display screen, the controller is configured to output an indicator respective to curvature change information of the display screen on a specific section of the display screen.

As shown in (a) of FIG. 15, in case the display screen of the display device 1500 according to the exemplary embodiment of the present invention is in the flat mode 1510, the display device 1500 outputs (or displays) an indicator 1530 notifying the user that the current curvature is equal to 0% on a specific section of the display screen. And, in case the curvature of the display screen is modified (or changed) and the display screen is shifted from the flat mode to the curved mode 1520, for example, the display device 1500 outputs (or displays) an indicator 1531 notifying the user that the current curvature of the display screen is equal to 30% on a specific section of the display screen. Additionally, as shown in (b) of FIG. 15, in case the display screen is in the flat mode 1510, the display device 1500 according to the exemplary embodiment of the present invention outputs (or displays) an indicator 1540 notifying the user that the display screen is currently in the flat mode on a specific section of the display screen. And, in case the curvature of the display screen is modified (or changed) and the display screen is shifted from the flat mode to the curved mode 1520, for example, the display device 1500 outputs (or displays) an indicator 1541 notifying the user that the current curved mode level of the display screen corresponds to level 3 on a specific section of the display screen. Furthermore, as shown in (c) of FIG. 15, in case the display screen is in the flat mode 1510, the display device 1500 according to the exemplary embodiment of the present invention outputs (or displays) an indicator 1550 notifying the user that the display screen is currently in the flat mode on a specific section of the display screen. And, in case the curvature of the display screen is modified (or changed) and the display screen is shifted from the flat mode to the curved mode 1520, for example, the display device 1500 outputs (or displays) an indicator 1551 notifying the user that the display screen is currently in the curved mode on a specific section of the display screen. Herein, when the display device is designed as described above, it may be advantageous in that the user can quickly verify the current state of the display screen.

Figure 16:
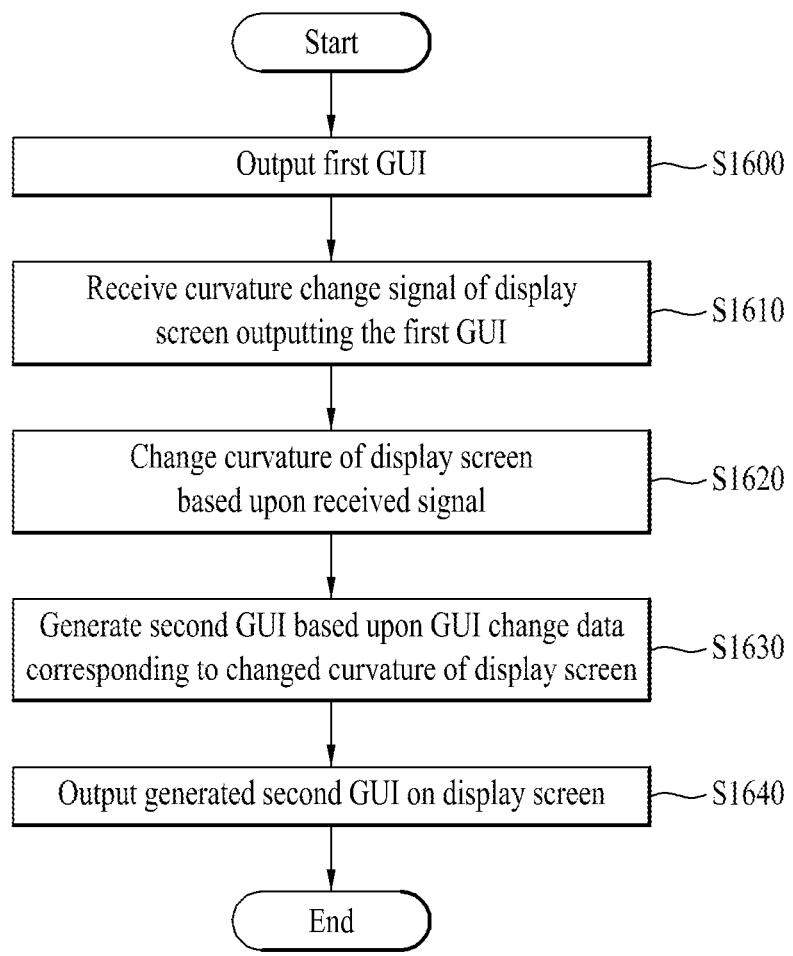
FIG. 16 illustrates a flow chart showing a method for controlling the display device according to the exemplary embodiment of the present invention.

FIG. 16 illustrates a flow chart showing a method for controlling the display device according to the exemplary embodiment of the present invention. Herein, anyone skilled in the art may supplementarily interpret the method for controlling the display device according to the exemplary embodiment of the present invention shown in FIG. 16 with reference to FIG. 1 to FIG. 15.

The display device according to the exemplary embodiment of the present invention outputs a first GUI (S1600) and, then, receives a curvature change signal of the display screen having the first GUI outputted thereto (S1610). Thereafter, based upon the received signal, the display device changes the curvature of the display screen (S1620) and, then, creates (or generates) a second GUI based upon GUI change data respective to the changed curvature of the display screen (S1630). Finally, the display device outputs the newly created second GUI on the display screen (S1640).

As described above, the display device and the method for controlling the same according to the exemplary embodiment of the present invention have the following advantages. According to an exemplary embodiment of the present invention, by generating a new GUI in accordance with a change in the curvature of the display device, the present invention may provide the user with an optimal graphical user interface (GUI). And, according to another exemplary embodiment of the present invention, by having the display device sense (or detect) position change information of the user and automatically detect curvature change information, the present invention may enhance user convenience. Finally, according to yet another exemplary embodiment of the present invention, by changing speaker output with respect to the curvature change of the display device, the present invention may define a solution for obtaining optimal sound effects (or audio effects) along with the newly generated GUI.

Furthermore, although each drawing of the present invention has been described by being differentiated from one another, the exemplary embodiment of the present invention may be configured as another exemplary embodiment of the present invention by combining any one of the above-described drawings with another one of the above-described drawings. Therefore, the display device and the method for controlling the same according to the exemplary embodiment of the present invention will not be limited only to the examples presented herein. It will be apparent that the exemplary embodiments of the present invention may be fully or partially modified and combined so as to implement a new exemplary embodiment of the present invention.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method for controlling a display device, the method comprising:
    outputting a first Graphical User Interface (GUI);
    receiving a curvature change signal of a display screen outputting the first GUI;
    changing a curvature of the display screen based upon the received signal;
    generating a second GUI by modifying a shape of the first GUI based upon GUI change data corresponding to the changed curvature of the display screen, wherein generating the second GUI includes:
        dividing the first GUI into a plurality of regions,
        modifying the regions based on the GUI change data to form modified regions, and
        moving a graphical object from a first one of the modified regions to a second one of the modified regions, a curve effect in the modified first region being less than a curve effect in the modified second region;
    outputting the generated second GUI having a curvature corresponding to the changed curvature of the display screen on the display screen; and
    setting each of a plurality of speakers associated with the display device to have a respective output direction corresponding to the changed curvature of the display screen when the generated second GUI is outputted on the display screen,
    wherein the modified shape of the first GUI has a curved shape corresponding to the changed curvature of the display screen, and the changed curvature of the display screen is calculated based on a change of a length in a second direction corresponding to a unit length of a first direction of the display screen.

2. The method of claim 1, wherein the receiving the curvature change signal of the display screen outputting the first GUI comprises:
    detecting position change information of a specific user; and
    obtaining curvature change information corresponding to the detected position change information of the specific user.

3. The method of claim 2, wherein detecting the position change information of the specific user includes determining a position of the specific user in real-time, and
    wherein the curvature of the display screen and the second GUI are automatically modified based on the position of the specific user in real-time.

4. The method of claim 1, further comprising:
    changing a size and an angle of a graphical pointer associated with an external inputting device connected to the display device corresponding to the changed curvature of the display screen.

5. The method of claim 1, further comprising:
    outputting an indicator respective to curvature change information of the display screen on a specific section of the display screen.

6. The method of claim 5, wherein the indicator identifies a degree to which the curvature deviates from a straight line.

7. A display device, comprising:
    a user interface configured to receive a curvature change signal;
    a memory configured to map curvature change information included in the received curvature change signal to Graphical User Interface (GUI) change data corresponding to the curvature change information and store the mapped result;
    a controller configured to control operations of the display; and
    a display configured to output at least one GUI on a display screen based upon a command of the controller,
    wherein, when the user interface receives a curvature change signal of the display screen outputting a first GUI, the controller is further configured to:
        change a curvature of the display screen based upon the received signal,
        extract GUI change data corresponding to the changed curvature of the display screen,
        generate a second GUI by modifying a shape of the first GUI based upon the extracted GUI change data,
        wherein the controller, when generating the second GUI, is further configured to:
            divide the first GUI into a plurality of regions,
            modify the regions based on the GUI change data to form modified regions, and
            move a graphical object from a first one of the modified regions to a second one of the modified regions, a curve effect in the modified first region being larger than a curve effect in the modified second region,
        output the generated second GUI having a curvature corresponding to the changed curvature of the display screen on the display screen,
        output, on the display screen, an indicator identifying a degree to which the curvature deviates from a straight line, and
        set each of a plurality of speakers associated with the display device to have an output direction corresponding to the changed curvature of the display screen when the generated second GUI is outputted on the display screen, and wherein the changed curvature of the display screen is calculated based on a change of a length in a second direction corresponding to a unit length of a first direction of the display screen.

8. The display device of claim 7, wherein the controller is further configured to detect position change information of a specific user, and obtain curvature change information corresponding to the detected position change information of the specific user, when the user interface receives the curvature change signal of the display screen outputting a first GUI.

9. The display device of claim 7, wherein the controller is further configured to obtain the changed curvature of the display screen, when the curvature of the display screen is changed based upon the received signal.

10. The display device of claim 7, wherein the controller is further configured to change a size and an angle of a graphical pointer associated with an external inputting device connected to the display device corresponding to the changed curvature of the display screen, when the second GUI is generated based upon the GUI change data corresponding to the changed curvature of the display screen.

11. The display device of claim 7, wherein the controller is further configured to:

output, on the display screen, an indicator identifying a degree to which the curvature deviates from a straight line.

12. The display device of claim 11, wherein the controller is further configured to output the indicator on a specific section of the display screen, when the generated second GUI is outputted on the display screen.

13. The display device of claim 7, wherein the controller, when detecting the position change information of the specific user, is further configured to determine a position of the specific user in real-time, and wherein the controller is further configured to automatically modify the curvature of the display screen and the second GUI based on the position of the specific user in real-time.

14. The display device of claim 13, wherein the controller is further configured to output, on the display screen, an indicator identifying a degree to which the curvature deviates from a straight line, and update the indicator based on the modified curvature of the display screen.

* * * * *